(12) United States Patent
Mendell et al.

(10) Patent No.: US 11,715,345 B2
(45) Date of Patent: Aug. 1, 2023

(54) SYSTEMS AND METHODS FOR USING A NON-REGULATED DEVICE TO GENERATE DATA OBJECTS VIA A REGULATED DEVICE

(71) Applicant: DraftKings, Inc., Boston, MA (US)

(72) Inventors: Jordan Mendell, Castle Rock, CO (US); Paul Liberman, Sharon, MA (US); Ed Zaleski, New Berlin, WI (US)

(73) Assignee: DraftKings, Inc., Boston, MA (US)

( * ) Notice: Subject to any disclaimer, the term of this patent is extended or adjusted under 35 U.S.C. 154(b) by 0 days.

(21) Appl. No.: 17/678,688

(22) Filed: Feb. 23, 2022

(65) Prior Publication Data

US 2022/0270431 A1      Aug. 25, 2022

Related U.S. Application Data

(60) Provisional application No. 63/153,185, filed on Feb. 24, 2021, provisional application No. 63/153,181, filed on Feb. 24, 2021.

(51) Int. Cl.
| | |
|---|---|
| *G07F 17/32* | (2006.01) |
| *G06F 16/955* | (2019.01) |
| *G06F 21/31* | (2013.01) |
| *G06F 21/44* | (2013.01) |

(Continued)

(52) U.S. Cl.
CPC .......... *G07F 17/323* (2013.01); *G06F 16/955* (2019.01); *G06F 21/31* (2013.01); *G06F 21/44* (2013.01); *G06Q 50/34* (2013.01); *G07F 17/3211* (2013.01); *G07F 17/3288* (2013.01); *H04N 21/482* (2013.01)

(58) Field of Classification Search
None
See application file for complete search history.

(56) References Cited

U.S. PATENT DOCUMENTS

| | | |
|---|---|---|
| 10,963,206 B2 | 3/2021 | Fitzgerald et al. |
| 2008/0096659 A1 | 4/2008 | Kreloff et al. |
| 2011/0300946 A1 | 12/2011 | Stafford et al. |

(Continued)

OTHER PUBLICATIONS

International Search Report and Written Opinion on PCT Appl. No. PCT/US2022/017518 dated Jul. 25, 2022.

(Continued)

*Primary Examiner* — Ronald Laneau
(74) *Attorney, Agent, or Firm* — Foley & Lardner LLP

(57) ABSTRACT

Systems and methods are provided for using a non-regulated device to generate data objects via a regulated device. A first device can provide interface content items corresponding to one or more events for which to generate a data object, and receive, via a user selection, object information identifying an event of the one or more events, one or more object parameters, and a second device identifier identifying a second device of the user. The first device can generate a request to provide the object information to one or more servers, and transmit the request to provide the object information to one or more servers. The request causes the one or more servers to store an entry including the object information, generate a link to the object information, and transmit a message including the link to the second device of the user using the second device identifier.

24 Claims, 13 Drawing Sheets

(51) Int. Cl.
*G06Q 50/34* (2012.01)
*H04N 21/482* (2011.01)

(56) References Cited

U.S. PATENT DOCUMENTS

| | | |
|---|---|---|
| 2013/0204825 A1 | 8/2013 | Su |
| 2014/0287839 A1* | 9/2014 | Olofsson ............ G07F 17/3204 |
| | | 463/42 |
| 2016/0014461 A1 | 1/2016 | Leech et al. |
| 2017/0201850 A1* | 7/2017 | Raleigh .................. H04W 4/50 |
| 2018/0246898 A1 | 8/2018 | White |
| 2019/0080427 A1 | 3/2019 | Lippert |
| 2019/0262721 A1 | 8/2019 | Macinnes et al. |
| 2020/0027314 A1 | 1/2020 | Pilnock et al. |
| 2020/0133452 A1 | 4/2020 | Gupta et al. |
| 2020/0213678 A1 | 7/2020 | Pleiman |
| 2020/0357246 A1 | 11/2020 | Nelson et al. |
| 2022/0103905 A1 | 3/2022 | Montgomery et al. |
| 2022/0270432 A1* | 8/2022 | Mendell ............. G07F 17/3211 |

OTHER PUBLICATIONS

Invitation to Pay Additional Fees and Partial International Search Report on PCT Appl. No. PCT/US2022/017518 dated Jun. 2, 2022.
Non-Final Office Action on U.S. Appl. No. 17/678,696 dated Jun. 22, 2022.
Final Office Action on U.S. Appl. No. 17/678,696 dated Oct. 27, 2022.

* cited by examiner

Wager History 123

| Wager | Parlay/Single | Wager Type | Pre-game/In-game | Wager Amount | Time |
|---|---|---|---|---|---|
| Wager A | P | W1 | Pre-game | C1 | T1 |
| Wager B | S | W2 | In-game | C2 | T2 |
| Wager C | S | W3 | Both | C3 | T3 |
| Wager D | P | W4 | In-game | C4 | T4 |

FIG. 1B

Wager History 488

| Wager | Parlay/Single | Wager Type | Pre-game/In-game | Wager Amount | Time |
|---|---|---|---|---|---|
| Wager A | P | W1 | Pre-game | C1 | T1 |
| Wager B | S | W2 | In-game | C2 | T2 |
| Wager C | S | W3 | Both | C3 | T3 |
| Wager D | P | W4 | In-game | C4 | T4 |

FIG. 4B

SYSTEMS AND METHODS FOR USING A NON-REGULATED DEVICE TO GENERATE DATA OBJECTS VIA A REGULATED DEVICE

This application claims the benefit of and priority to U.S. Provisional Patent Application No. 63/153,181, filed on Feb. 24, 2021, and U.S. Provisional Patent Application No. 63/153,185, filed on Feb. 24, 2021, the contents of each of which are hereby incorporated by reference in their entirety for all purposes.

BACKGROUND

Broadcast devices, such as cable boxes or set-top boxes, are used to display broadcast content received from a broadcast source. Due to the one-to-many nature of broadcast content, it is challenging to monitor and display information relating to a specific broadcast device with broadcast content.

BRIEF SUMMARY OF THE DISCLOSURE

Systems and methods of the present solution are directed to using a non-regulated device to generate data objects via a regulated device. A non-regulated device can be a device that is not registered, not authorized, or otherwise not compliant for generating particular data objects. A regulated device can be a device that is registered, authorized or otherwise compliant for generating such data objects. By way of the present disclosure, a non-regulated device can communicate with one or more regulated devices to allow users to select and data objects to generate via the regulated devices based in part on content provided at the non-regulated device. The non-regulated device can be located or positioned in a public area or public venue (e.g., sports stadium setting) to provide access to the content to a plurality of different users.

The systems and methods described herein can reduce the resource needs of the server and/or user device by using resources of a network node to generate and/or provide portions of the content presented at a first user device (e.g., a non-regulated device). For example, rather than maintaining a large number of data objects or large data set of object information at the server or one or more user devices, which requires a significant use of resources, the data can be maintained at different devices including node, server and/or user devices, thus improving the efficiency of the allocation of computer resources. The data objects (or recommendations for data objects) can be generated dynamically as content is being provided or streamed to a user device to reduce the storage of data and increase the efficiency of the allocation of computer resources. In embodiments, computer resources can be managed by prioritizing which data object recommendations and associated object information is provided to a user device based in part on a streaming or viewing history of the user and dynamically changing data associated with one or more events.

At least one aspect of the present disclosure is directed to a method. The method may be performed, for example, by a first device having one or more processors. The method includes providing an interface having a plurality of content items corresponding to one or more events for which to generate a data object. The method includes receiving, from a user via the interface, responsive to selection of one or more content items of the plurality of content items, object information identifying an event of the one or more events, one or more object parameters, and a second device identifier identifying a second device of the user. The method includes generating, responsive to receiving the object information via the interface, a request to provide the object information to one or more servers. The method includes transmitting, to the one or more servers, the request to provide the object information.

The request can include data that when received by the one or more servers, causes the one or more servers to i) store, in one or more data structures, an entry including the object information, ii) generate a link to the object information in the one or more data structures, and iii) transmit a message to the second device of the user using the second device identifier. The message can include the link. When the link is accessed via the second device, the link causes the second device to launch an application executable on the second device that is configured to establish a communication session with the one or more servers and access the object information stored in the one or more data structures via the communication session and present an actionable object configured to cause the second device to transmit instructions to the one or more servers to generate the data object using the object information.

In some implementations, the first device is a broadcast receiver device configured to present live content corresponding to the one or more events. In some implementations, the method includes modifying, responsive to an interaction with the link at the second device, at least one object parameter associated with the event using a time of the interaction and a time of the one or more data structures. In some implementations, the method includes providing, to the application, the modified object parameters for selection by the user of the second device.

In some implementations, the method includes generating the message to include one or more data packets. The one or more data packets can include the link and a device identifier for the second device of the user in a payload portion of the one or more data packets. In some implementations, the method includes performing, with the second device, a handshake responsive to an interaction with the link at the second device to transmit the one or more data structures to the second device from the interface of the first device.

In some implementations, the method includes assigning a time value to the one or more events associated with each of the plurality of content items, the time value indicating an expiration date for the event. In some implementations, the one or more object parameters of the event include at least one of an object type or an object amount. In some implementations, the method includes providing a prompt to authenticate the user prior to providing the interface. In some implementations, the method includes transmitting, to the one or more servers, information received from the user responsive to the prompt to authenticate the user. In some implementations, the method includes receiving, from the one or more servers, an authentication signal indicating the user is authenticated.

At least one other aspect of the present disclosure is directed to a method. The method can include receiving, from a first device of a user, object information identifying an event of one or more events, one or more object parameters, and a second device identifier identifying a second device of the user. The object information can be generated via an interface of the first device. The method includes storing the object information in one or more data structures. The method includes generating a link to the object information stored in the one or more data structures. The method includes transmitting a message to the second device of the user using the second device identifier, the message including the link. The method includes receiving, from the second device responsive to establishing a communication session between the second device and the one or more servers, a request to access the object information responsive to an interaction with the link on the second device. The method includes providing, to the second device using the second device identifier, the object information stored in the one or more data structures. The object information can be presented on the second device with an actionable object configured to cause the second device to transmit instructions to the one or more servers to generate a data object using the object information. The method includes receiving, responsive to an interaction with the actionable object, via the communication session, a request to generate the data object using the object information. The method includes generating the data object responsive to the request.

In some implementations, wherein the one or more servers receive the object information from the first device, and wherein the user is not signed into a user account at the first device. In some implementations, prior to receiving the request to generate the data object, the user is signed into the user account on the second device. In some implementations, the first device is a broadcast receiver device configured to present live content corresponding to the one or more events. In some implementations, the method includes modifying at least one object parameter associated with the event based on an interaction performed at the second device. In some implementations, the method includes identifying a respective time value associated with the one or more events, the time value indicating an expiration date for the event. In some implementations, the one or more object parameters of the event includes at least one of an object type or an object amount.

At least one other aspect of the present disclosure is directed to a system. The system can include a first device comprising one or more processors coupled to a non-transitory memory. The system can provide an interface having a plurality of content items corresponding to one or more events for which to generate a data object. The system can receive, from a user via the interface, responsive to selection of one or more content items of the plurality of content items, object information identifying an event of the one or more events, one or more object parameters, and a second device identifier identifying a second device of the user. The system can generate, responsive to receiving the object information via the interface, a request to provide the object information to one or more servers. The system can transmit, to the one or more servers, the request to provide the object information. The request including data that when received by the one or more servers, causes the one or more servers to i) store, in one or more data structures, an entry including the object information, ii) generate a link to the object information in the one or more data structures, and iii) transmit a message to the second device of the user using the second device identifier. The message can include the link. When the link is accessed via the second device, the link causes the second device to launch an application executable on the second device that is configured to establish a communication session with the one or more servers and access the object information stored in the one or more data structures via the communication session and present an actionable object configured to cause the second device to transmit instructions to the one or more servers to generate the data object using the object information.

In some implementations, the first device is a broadcast receiver device configured to present live content corresponding to the one or more events. In some implementations, the system can modify, responsive to an interaction with the link at the second device, at least one object parameter associated with the event using a time of the interaction and a time of the one or more data structures. In some implementations, the system can provide, to the application, the modified object parameters for selection by the user of the second device. In some implementations, the system can generate the message to include one or more data packets, the one or more data packets including the link and a device identifier for the second device of the user in a payload portion of the one or more data packets.

In some implementations, the system can perform, with the second device, a handshake responsive to an interaction with the link at the second device to transmit the one or more data structures to the second device from the interface of the first device. In some implementations, the system can assign a time value to the one or more events associated with each of the plurality of content items, the time value indicating an expiration date for the event. In some implementations, the one or more object parameters of the event includes at least one of an object type or an object amount.

In some implementations, the system can provide a prompt to authenticate the user prior to providing the interface. In some implementations, the system can transmit, to the one or more servers, information received from the user responsive to the prompt to authenticate the user. In some implementations, the system can receive, from the one or more servers, an authentication signal indicating the user is authenticated.

At least one other aspect of the present disclosure is directed to another system. The system can include one or more processors coupled to a non-transitory memory. The system can receive, from a first device of a user, object information identifying an event of one or more events, one or more object parameters, and a second device identifier identifying a second device of the user, the object information generated via an interface of the first device. The system can store the object information in one or more data structures. The system can generate a link to the object information stored in the one or more data structures. The system can transmit a message to the second device of the user using the second device identifier, the message including the link. The system can receive, from the second device responsive to establishing a communication session between the second device and the one or more processors, a request to access the object information responsive to an interaction with the link on the second device. The system can provide, to the second device using the second device identifier, the object information stored in the one or more data structures, the object information presented on the second device with an actionable object configured to cause the second device to transmit instructions to the one or more processors to generate a data object using the object information. The system can receive, responsive to an interaction with the actionable object, via the communication session, a request to generate the data object using the object information. The system can generate, the data object responsive to the request.

In some implementations, the system can receive the object information from the first device, wherein the user is not signed into a user account at the first device. In some implementations, prior to receiving the request to generate the data object, the user is signed into the user account on the second device. In some implementations, the first device is a broadcast receiver device configured to present live content corresponding to the one or more events. In some implementations, the system can modify at least one object parameter associated with the event based on an interaction performed at the second device.

In some implementations, the system can identify a respective time value associated with the one or more events, the time value indicating an expiration date for the event. In some implementations, the one or more object parameters of the event includes at least one of an object type or an object amount.

At least one other aspect of the present disclosure is directed to a method. The method can be performed, for example, by a serving having one or more processors. The method can include determining that a first device of a user is presenting content corresponding to a live event satisfying a condition. The method can include identifying, responsive to determining that the first device is presenting the content corresponding to the live event, object information corresponding to the event, one or more object parameters corresponding to the live event, a time value of the live event. The method can include providing, to the first device, one or more content items for display concurrent with the live event by the first device, each content item of the one or more content items including a link corresponding to a respective object recommendation, that when accessed via the first device, causes the server to transmit a message to a second device of the user using a second device identifier and present an actionable object configured to cause the second device to transmit instructions to generate a data object corresponding to the content item. The method can include receiving, by the server from the second device, the instructions generate the data object. The method can include generating, by the server, the data object based on the one or more object parameters of the respective event.

In some implementations, the method can include identifying a plurality of events accessed by the user during a determined time period. In some implementations, the method can include generating one or more recommendations for the event responsive based on the one or more object parameters for each event of the plurality of events. In some implementations, the method can include providing, to the first device, a subsequent data structure responsive to the first device presenting a second broadcast of a subsequent event of the plurality of events, the subsequent data structure including the one or more recommendations for the subsequent event of the plurality of events.

In some implementations, the method can include accessing, from one or more servers, a schedule for broadcast content corresponding to the plurality of events over a predetermined time period. In some implementations, the method can include determining position information indicative of a location to display the one or more content items within the display of the first device such that the one or more content items and the event are visible to the user through the display of the first device. In some implementations, the method can include providing, to the first device, the position information with the one or more content items, wherein the first device displays the one or more content items concurrent with the event through the first device based on the location indicated by the position information.

In some implementations, the method can include modifying, responsive to a change in the event, position information for the one or more content items, the position information indicative of a location to display the one or more content items within the display of the first device such that the one or more content items and the event are visible to the user through the display of the first device. In some implementations, the method can include providing, to the first device, the position information that causes the first device to modify the display of the one or more content items from a first position within the display of the first device to a second position within the display of the first device.

In some implementations, the method can include modifying, responsive to an interaction by the user with the first device, position information for the one or more content items, the position information indicative of a location to display the one or more content items within the display of the first device such that the one or more content items and the event are visible to the user through the display of the first device. In some implementations, the method can include providing, to the first device, the position information that causes the first device to modify the display of the one or more content items from a first position within the display of the first device to a second position within the display of the first device.

In some implementations, the method can include accessing, from one or more servers, a user profile associated with the user, the user profile including account information for the user. In some implementations, the method can include generating the one or more content items to include the account information for the user, wherein the first device displays the one or more content items including the account information concurrent with the event through the first device. In some implementations, the method can include identifying, from the user profile associated with the user, a viewing history for the user for a time period, the viewing history indicative of one or more events previously presented to the user. In some implementations, the method can include generating the one or more content items to include one or more recommendations for the plurality of events available to the user.

In some implementations, the method can include ranking the one or more recommendations based on a duration indicated by the time value for the event. In some implementations, the method can include assigning, based on the ranking, a location for each of the one or more recommendations for display at the first device.

At least one other aspect of the present disclosure is directed to a system. The system can include a server comprising one or more processors coupled to memory. The system can determine that a first device of a user is presenting content corresponding to a live event satisfying a condition. The system can identify, responsive to determining that the first device is presenting the content corresponding to the live event, object information corresponding to the event, one or more object parameters corresponding to the live event, a time value of the live event. The system can provide, to the first device, one or more content items for display concurrent with the live event by the first device, each content item of the one or more content items including a link corresponding to a respective object recommendation, that when accessed via the first device, causes the server to transmit a message to a second device of the user using a second device identifier and present an actionable object configured to cause the second device to transmit instructions to generate a data object corresponding to the content item. The system can receive, from the second device, the instructions generate the data object. The system can generate the data object based on the one or more object parameters of the respective event.

In some implementations, the system can identify a plurality of events accessed by the user during a determined time period. In some implementations, the system can generate one or more recommendations for the event responsive based on the one or more object parameters for each event of the plurality of events. In some implementations, the system can provide, to the first device, a subsequent data structure responsive to the first device presenting a second broadcast of a subsequent event of the plurality of events, the subsequent data structure including the one or more recommendations for the subsequent event of the plurality of events.

In some implementations, the system can access, from one or more servers, a schedule for broadcast content corresponding to the plurality of events over a predetermined time period. In some implementations, the system can determine position information indicative of a location to display the one or more content items within the display of the first device such that the one or more content items and the event are visible to the user through the display of the first device. In some implementations, the system can provide, to the first device, the position information with the one or more content items, wherein the first device displays the one or more content items concurrent with the event through the first device based on the location indicated by the position information.

In some implementations, the system can modify, responsive to a change in the event, position information for the one or more content items, the position information indicative of a location to display the one or more content items within the display of the first device such that the one or more content items and the event are visible to the user through the display of the first device. In some implementations, the system can provide, to the first device, the position information that causes the first device to modify the display of the one or more content items from a first position within the display of the first device to a second position within the display of the first device.

In some implementations, the system can modify, responsive to an interaction by the user with the first device, position information for the one or more content items, the position information indicative of a location to display the one or more content items within the display of the first device such that the one or more content items and the event are visible to the user through the display of the first device. In some implementations, the system can provide, to the first device, the position information that causes the first device to modify the display of the one or more content items from a first position within the display of the first device to a second position within the display of the first device.

In some implementations, the system can access, from one or more servers, a user profile associated with the user, the user profile including account information for the user. In some implementations, the system can generate the one or more content items to include the account information for the user, wherein the first device displays the one or more content items including the account information concurrent with the event through the first device.

In some implementations, the system can identify, from the user profile associated with the user, a viewing history for the user for a time period, the viewing history indicative of one or more events previously presented to the user. In some implementations, the system can generate the one or more content items to include one or more recommendations for the plurality of events available to the user. In some implementations, the system can rank the one or more recommendations based on a duration indicated by the time value for the event. In some implementations, the system can assign, based on the ranking, a location for each of the one or more recommendations for display at the first device.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1B is a table depicting an embodiment of a wager history;

FIG. 4B is a table depicting an embodiment of a wager history;

DETAILED DESCRIPTION

Figure 1A:
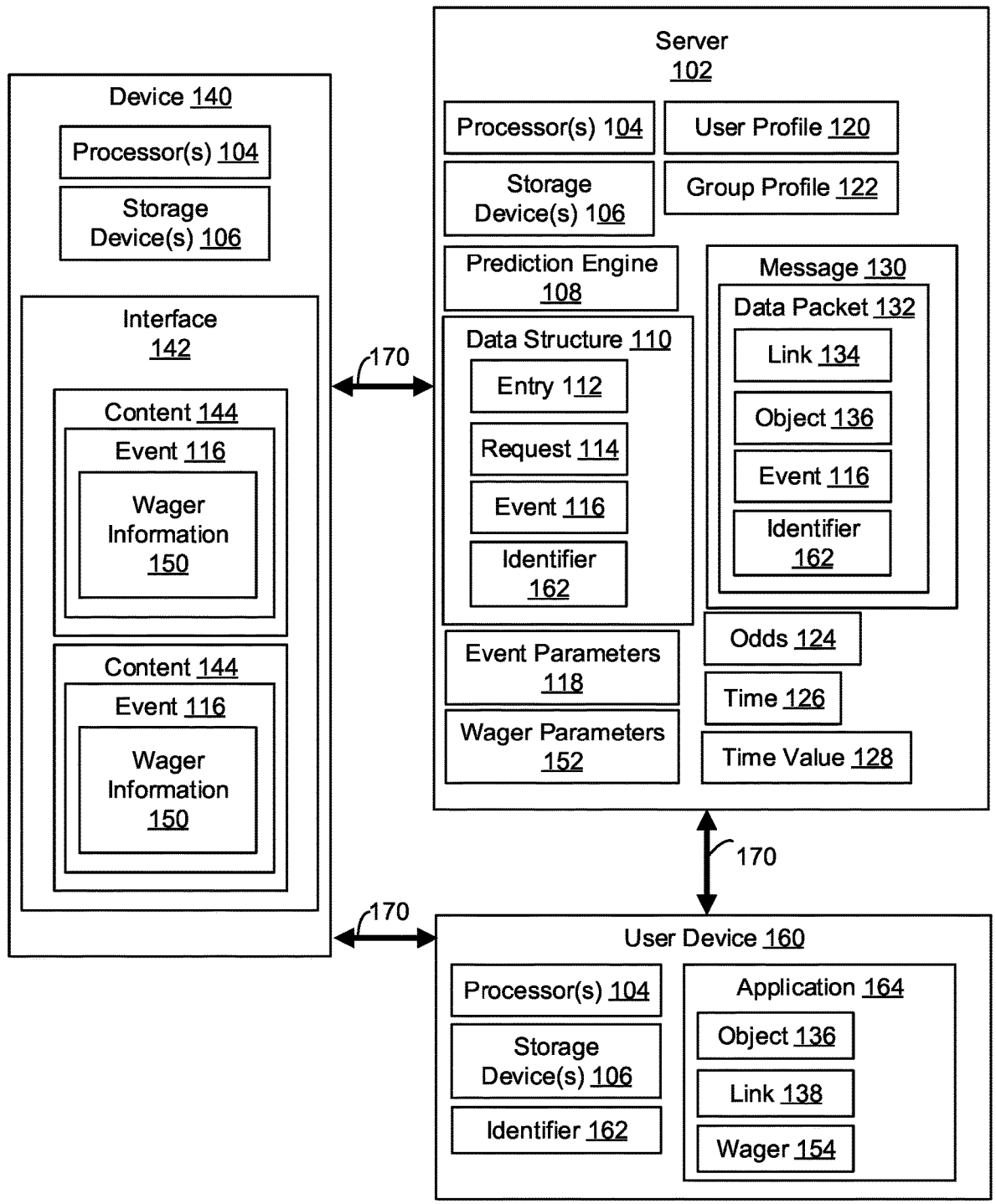
FIG. 1A is a block diagram depicting an embodiment of a network environment comprising a non-regulated device in communication with regulated devices via a network.

For purposes of reading the description of the various embodiments below, the following descriptions of the sections of the specification and their respective contents may be helpful:

Section A describes embodiments of systems and methods for using a non-regulated device to generate data objects via a regulated device.

Section B describes embodiments of systems and methods for providing content items based on streaming data.

Section C describes a network environment and computing environment which may be useful for practicing embodiments described herein.

A. Systems and Methods for Using a Non-Regulated Device to Generate Data Objects Via a Regulated Device The systems and methods described herein can reduce the resource needs of the server and/or user device by providing a portion of the content at a non-regulated device that is shared by a plurality of different users and may not be specifically owned or maintained by one specific user. For example, rather than maintaining a large number of content items or large data set of wager information at the server or one or more user devices which requires a significant use of resources, the data can be maintained at different devices including non-regulated devices and regulated devices, thus improving the efficiency of the allocation of computer resources. Computer resources can be managed by prioritizing which content items and associated wager information is provided to a user device based in part on selections made at a non-regulated device and dynamically changing data associated with one or more events.

Systems and methods of the present solution are directed to using a non-regulated device to generate data objects via a regulated device. Content can be presented to one or more users through a user interface of a non-regulated device, for example, in a public setting or venue. The non-regulated device can include, but is not limited to, a public device, public kiosk, public terminal or a device accessible to a plurality of different users. In some implementations, the non-regulated device can include a television or other personal media device, such as a set-top box connected to a display, or another type of display device. Any of the techniques described in this section can be implemented, or performed, by any of the computing devices described herein in connection with Section B. In some embodiments, the non-regulated device can include a device that none of the users interacting with the device are signed into or have provided credentials or personal information. The content can include event information and object information associated with one or more events (e.g., sports contests, sports match-ups). The non-regulated device can provide an interaction environment for a plurality of different users to be exposed to content and make selections or request information to later place a wager.

The non-regulated device can communicate with one or more regulated devices including a content server to receive the content that is displayed in the public setting and provide selections of content items from the non-regulated device. The non-regulated device can receive a selection through the user interface that includes or indicates object information associated with at least one event. The wager information can identify the event, one or more wager parameters, and a device identifier for at least one device associated with the user making the selection. The non-regulated device can generate a request to provide the wager information to the content server and transmit the request including the wager information to the content server.

The content server can store the wager information, for example, in a data structure and link or associate the data structure with a user profile for the user making selection. The content server can use the received wager information to generate a link for one or more devices associate with the user that made the original selection. For example, the link can include script, code or instructions such that when the link is accessed via a device, causes the respective device to launch an application (e.g., user application) that is configured to stablish a session to the content server and receive the wager information. In embodiments, the content server can populate the application to include the wager information or provide the wager information responsive to an interaction with the link such that the application displays the wager information to the user on the user device. The application can present or display a wager initiation action object that includes the wager information or one or more wager opportunities associated with the wager information. The actionable object can be configured to cause the user device to transmit instructions to the content server to place a wager using the wager information and/or one or more wager opportunities. In embodiments, the user can place or initiate a wager, based in part on the wager information selected at the non-regulated device, using an application executing on the users device.

Referring now to FIG. 1A, depicted is an environment 100 having a server 102, a non-regulated device 140 (e.g., kiosk), and one or more user devices 160. The non-regulated device 140 can provide or display content item 144, for example, in a public setting or public venue to a plurality of different users and the content item 144 can include events 116 and wager information (sometimes referred to herein as "object information") associated with the events 116. The users can interact with the non-regulated device 140 to make selections or request information to place a wager (wherein placing a wager is sometimes referred to herein as "generating a data object") via a regulated device (e.g., user device 160) concurrently with making the selection or at later time after making the selection. The non-regulated device 140 can provide a public terminal or public venue for users to socialize and interact with each other while content and object information is provided to each of the users.

The environment 100 can include a cloud computing environment. The cloud computing environment 100 may be public, private, or hybrid. Public clouds may include public servers that are maintained by third parties to one or more user devices 160 or the owners of one or more user devices 160. The servers may be located off-site in remote geographical locations as disclosed above or otherwise. Public clouds may be connected to the servers over a public network. Private clouds may include private servers that are physically maintained by one or more user devices 160 or owners of one or more user devices 160. Private clouds may be connected to the servers over a private network. Hybrid clouds may include both the private and public networks and servers. In embodiments, the environment 100 can be the same as or substantially similar to network 870 or cloud 875 of FIG. 8B.

The server 102 can include a regulated device or a content server configured to generate one or more content items 144 to provide to the non-regulated device 140. The server 102 can be implemented using hardware or a combination of software and hardware. For example, each component of the server 102 can include logical circuitry (e.g., a central processing unit or CPU) that responses to and processes instructions fetched from a memory unit (e.g., memory, storage device 106). Each component of the server 102 can include or use a microprocessor or a multi-core processor. A multi-core processor can include two or more processing units (e.g., processor 104) on a single computing component. Each component of the server 102 can be based on any of these processors, or any other processor capable of operating as described herein. Each processor can utilize instruction level parallelism, thread level parallelism, different levels of cache, etc. For example, the server 102 can include at least one logic device such as a computing device having at least one processor 104 to communicate, for example, with one or more non-regulated devices 140 and/or one or more user devices 160. The components and elements of the server 102 can be separate components or a single component. The server 102 can include a memory component (e.g., storage device 106) to store and retrieve content item 144, event information 116, and/or wager information 150. The memory 106 can include a random access memory (RAM) or other dynamic storage device, for storing information, and instructions to be executed by the server 102. The memory 106 can include at least one read only memory (ROM) or other static storage device for storing static information and instructions for the server 102. The memory 106 can include a solid state device, magnetic disk or optical disk, to persistently store information and instructions. In some embodiments, the server 102 can include or deployed as, and/or be executed on any type and form of computing device, such as any desktop computer, laptop computer, or mobile device capable of communication over at least one network and performing the operations described herein. In embodiments, the server 102 can be the same as or substantially similar to computer 800 of FIG. 8A or server 895 of FIG. 8B. The server 102 can be used to implement, or perform, any of the functionalities of the server 402 described herein in connection with Section B of the present disclosure.

The server 102 can maintain one or more user profiles 120, for example, for a plurality of different users. In embodiments, each user profile 120 can be linked with or associated with at least one user. In some embodiments, a user profile 120 can be generated for a user responsive to a registration process, log-in attempt and/or responsive to a first interaction with the server 102 and/or non-regulated device 140 by the respective user. The user profile 120 can include a data structure or entry in a database of the memory 106 of the server 102 for storing and maintaining wager information 150, wager parameters 152 (sometimes referred to herein as "object parameters 152"), event information 116 and/or event parameters 118 for the user. The user profiles 120 can include historical data or previous wagers, selections or interactions made by the user. In embodiments, the user profile 120 can include a wager history 123 for the user. The user profiles 120 can include user preferences including, but not limited to, hometown, location, favorite sports teams, favorite sports, favorite athletes, and/or favorite types of wagers.

The server 102 can maintain one or more group profiles 122. The group profile 122 can include a group of users or group of user profiles 120 having similar user preferences, historical data, previous wagers, selections and/or interactions with the server 102 and/or a non-regulated device 140. The group profile 122 can include a group of users or group of user profiles 120 participating in or active in the same contest or placing wagers on the same content item 144 and/or events 116 (e.g., active event, current event). The group profile 122 can include or link together a plurality of user profiles 120 for a plurality of different users, for example, to recommend or identify content item 144 for the members of the group profile 122 based in part on the data associated with the other members of the group profile 122. In embodiments, the group profile 122 can include a wager history 123 for the group of users.

The server 102 can generate one or more data structures 110 that include one or more entries 112 for storing wager information 150 received from a non-regulated device 140. An entry 112 can include a request 114, event information 116, or a device identifier 162. The request 114 can include a data structure, an instruction, code, script or command. The request 114 can include information associated with at least one selection by a user. In embodiments, the request 114 can include or identify one or more content items 144, wager information 150, an event 116, a device identifier 162, and/or a user profile 120.

The event 116 can include a contest, sporting event, or any type of event that a user can place a wager on or bet on. For example, the event 116 can include a contest that one or more users can register for to participate in (e.g., registrants). The event 116 can include or refer to, but is not limited to, a football game, basketball game, a soccer match, golf tournament, baseball game, an e-sports event (e.g. a video game or computer game contest), or any type of sporting contest. The event 116 can include sporting events that are scheduled within a determined time period (e.g., planned but not started yet) and/or active sporting events that are underway (e.g., have started or begun) but have not completed yet. The event 116 can include one or more parameters. The event parameters 118 can include, but are not limited to, a type of wager 154, a wager amount, a team name, a contest name and/or an outcome. The event parameters 118 can include, but are not limited to, a time when a selection was made, a time when a wager 154 was placed, a type of sport, a type of contest, odds 124 associated with the event 116, and/or odds 124 associated with the wager 154.

The device identifier 162 can include a script, code, label, or marker that identifies a particular device. In embodiments, the device identifier 162 can include a string or plurality of numbers, letters, characters or any combination numbers, letters, and characters. In some embodiments, each device can have a unique device identifier 162. The wager parameters 152 can include, but are not limited to, a type of wager 154 (wagers are sometimes referred to herein as "data object(s)"), a wager amount, a time associated with the wager 154 (e.g., when wager was placed), one or more teams included in the wager 154, a contest name, an outcome, a time when a selection was made, a time when a wager 154 was placed, a type of sport, a type of contest, odds 124 (where the odds are sometimes referred to herein as "object parameter(s)") associated with the event 116, and/or odds 124 associated with the wager 154.

The server 102 can generate a message 130 to provide a user device 160 wager information 150 associated with at least one selection made a user of the user device 160. The message 130 can include a data structure, data packet 132, script, code, instruction or command. In embodiments, the message 130 can include a link 134 generated by the server 102.

The link 134 can include a hyperlink, uniform resource locator (URL) or reference to data, for example, at another document, device 160, non-regulated device 140 or server 102. In embodiments, the link 134 can be configured to cause a device 160 to establish or request a communication session 170 between the respective device 160 and a server 102 and/or a non-regulated device 140. In some embodiments, the link 134 can be configured to cause a device 160 to launch an application 164 (e.g., user application) that is configured to establish or request a communication session 170 between the respective device 160 and a server 102 and/or a non-regulated device 140. In embodiments, the link 134 can refer to or point to a data structure 110 including the content item 144, event 116, and wager information 150 associated with a selection made by the user of the user device 160, for example, at a non-regulated device 140.

Odds 124 can include or refer to a measure of the likelihood of a particular outcome in a contest or event 116. In embodiments, the odds 124 can be calculated or determined as a ratio of a number of events or occurrences during an event 116 that produce a particular outcome versus the number of events or occurrences during the event 116 that don't produce the particular outcome. The odds 124 can be based in part on generated based in part on a time value (e.g., time remaining) in a particular event 116. The odds 124 can be dynamically modified, for example, in response to a change in a time value of an event 116 and/or one or more occurrences during an event 116.

In some embodiments, the odds can be retrieved from or generated by a separate server or entity. For instance, the server 102 can be configured to receive odds and other wager data for various wagers from one or more wager servers. The wager servers can be servers at which the wagers are placed and the server 102 can be configured to transmit instructions to the one or more wager servers to place the wagers on behalf of a user. It should further be appreciated that various components of the server 102 shown in FIG. 1A can be stored or maintained by other servers and that the server 102 can be configured to communicate with one or more other servers including the wager servers.

The time 126 can include a time stamp, a time range, a time period or a particular point in time. In embodiments, the time 126 can indicate a time of an interaction (e.g., with a link, with a content item), a time remaining in an event 116, a time associated with a content item 144. The time value 128 can include a time stamp, a time range, a time period or a particular point in time. In embodiments, the time value 128 can include or represent an expiration date for an event 116. For example, the server 102 can assign a time value 128 to an event 116 based in part on a start time, duration and/or end time for the event 116. The time value 128 can indicate when the event 116 expires and/or when an opportunity to place a wager 154 on the event 116 expires.

In some embodiments, the server 102 can generate the content items 144 based in part on data received from one or more data sources. The data sources can include a game server that provides real-time updates to live sporting events, one or more servers of sportsbooks or other servers that generate odds or lines for live sporting events, among others. For example, the server 102 can be in communication with one or more third party servers that periodically provide data that the server 102 can use to generate one or more content items 144 and/or update one or more data structures 110 with information or data to be included in content items 144 that are then presented to non-regulated devices 140 and/or user devices 160 associated with users. The data provided to the server 102 can include a plurality of possible future outcomes for one or more sporting events 116, including but not limited to future outcomes pertaining to individual players, teams, or multiple teams. In addition, the data can include a current value that is based on a likelihood that a particular future outcome will occur based on a current status of one or more sporting events 116. In some such embodiments, the server 102 can establish and maintain a communication channel with the one or more third-party servers and utilize a recommendation policy that enables the server 102 to access the data maintained by the one or more third-party servers, including the data the server 102 can use to generate the one or more content items 144. In some embodiments, the server 102 can be configured to perform one or more functions of the third-party servers, including but not limited to dynamically generating content items 144 or updating content items 144 based on a likelihood that particular future outcomes will occur based on a current status of one or more sporting events 116.

The server 102 can include a prediction engine 108. The prediction engine 108 can generate predictions and probabilities (e.g., odds 124) on future outcomes for one or more events 116. The prediction engine 108 can use data for an event 116 including, but not limited to, the teams involved, players involved, time of the event 116, and/or time remaining in the event 116. In embodiments, the prediction engine 108 can generate odds 124 for one or more outcomes (e.g., final score, points scored by each team, winning team) of an event 116. The prediction engine 108 can generate data that indicates that an outcome or feature of the real sports event 116 being above, equal to, or below a threshold. The prediction engine 108 can generate data that indicates odds 124 a particular outcome may be achieved if one or more players or one or more teams scores a predetermined number of points, or achieves a pre-determined number of instances of an objective (e.g. touchdowns), or if at least a predetermined total number of points is scored in a game (an "over/under" for a game point total), or if another objective is achieved (e.g. a shutout), or some combination of the above. The prediction engine 108 can assign weights to one or more outcomes that is indicative of a strength or likelihood of the outcome occurring. The weights may be determined in any appropriate manner, including by a machine-learning algorithm trained on a training data set. The term "machine-learning algorithm" can be used herein to refer to an algorithm determined by a process including machine learning (e.g. a machine-trained algorithm).

In embodiments, the prediction engine 108 can determine a real-time event status for one or more events 116. The real-time event status can relate to any real-time condition, status, or action of a real event 116. For example, the real-time event status can indicate whether a game is close (e.g. whether a score difference between two teams is equal to or smaller than a threshold), or whether a prediction on a future outcome of the event 116 or content item 144 is close to being satisfied (e.g. whether a total number of points in a game is close to a total number of points corresponding to an over-under prediction on a future outcome (e.g. within a threshold of the over-under)). Such thresholds can be determined based on a time 126 (e.g. a time since the start of the event or game, or a time remaining in the event or game). For example, a first threshold may be implemented for a remaining time 126 that falls within a first predetermined range (e.g. a second-to-last quarter of total game time), and a second threshold may be implemented for a remaining time 126 that falls within a second predetermined range (e.g. e.g. a last quarter of total game time). The second threshold may be smaller than the first threshold. Thus, the server 102 or non-regulated device 140 can account for time remaining in an event 116 when determining whether the prediction on a future outcome associated with a content item 144 is close to being satisfied. The real-time status can indicate or can be that a game is close or not (e.g. a binary indication), or can indicate or can be a degree of closeness (e.g. based on a difference between the scores of two teams or a difference between a point total and an under/under line). In embodiments, any other real-time condition, status, or action of a real event 116 or game can relate to a real-time event status of a content item 144. For example, the real-time event status of the content item 144 can relate to whether one or more points were just scored in a game, or if a team is in a "red-zone" or has been awarded a penalty shot, or if a remaining game time is equal to or below a threshold (or if a time since the start of the game is equal to or above a threshold). A content item 144 may have one or more real-time statuses.

The non-regulated device 140 can include a public device, a terminal, a kiosk, an interactive terminal that provides access to information and applications to a plurality of different users. The non-regulated device 140 can be deployed or positioned in a public setting, such as but not limited to, a sports contest, a shopping center, or an urban market to provide access to information such as one or more content items 144 associated with one or more events 116 for users to place a wager 154. In some embodiments, the non-regulated device 140 can include a device that is not associated with or owned by one particular user. For example, in some embodiments, a user can interact with the non-regulated device 140 without providing personal information, logging into the non-regulated device 140, and/or signing into an account at the non-regulated device 140. In some implementations, the non-regulated device 140 can be a television or another non-regulated device that provides streaming content. The non-regulated device 140 can implement, or perform, any of the functionalities of the user device 460 detailed herein below in connection with Section B of the present disclosure.

The non-regulated device 140 can provide or display one or more content items 144. The content items 144 can be displayed through a user interface 142 of the non-regulated device 140. The user interface 142 can include a graphical user interface (GUI) (e.g., a touchscreen, a display, etc.) and one or more input/output (I/O) devices (e.g., a mouse, a keyboard, digital key pad). The user interface 142 can include a display or portion of a display of the non-regulated device 140. The user interface 142 can include a tough screen displaying the content items 144 in a menu or listing and in the form of selectable content items 144. The user interface 142 can include an input device that couples or communicates with a display of the non-regulated device 140 to enable a user to interact with the content items 144 provided through the display and make selections and/or provide feedback to the non-regulated device 140. The user interface 142 can enable interaction with one or more visual indications provided through the display of the non-regulated device 140 and responsive to an interaction (e.g., select, click-on, touch, hover), the user interface 142 can generate an indication identifying a user input and/or selection of at least one content item 144.

The content items 144 can include a data structure, code, script or instruction identifying one or more events 116 and wager information 150 for each event 116 of the one or more events 116. The content items 144 can include a reference to (e.g. can include a reference included in a text, an image, a video, a hyperlink, an interactive object for initializing an application, or another media item) one or more events 116. In some embodiments, the content items 144 can include a recommendation including one or more events 116 and an actionable object 136 for each recommendation and/or each event 116 of the one or more events 116. In embodiments, the actionable object 136 can be linked to wager information 150 for the corresponding event 116.

The wager information 150 (sometimes referred to herein as "object information") can include, but is not limited to, odds 124 (sometimes referred to herein as "object parameters") for one or more outcomes for the event 116, one or more outcomes for the event 116, a type of wager, a wager amount, a type of contest (e.g., type of sports contest), a time 126 for the event 116, one or more teams involved with the event 116, and/or one or more players (e.g., participants, athletes) participating in the event 116. The non-regulated device 140 can generate one or more requests 114 to transmit or provide wager information 150 to one or more servers 102. The request 114 can include a data structure, an instruction, code, script or command. The request 114 can include information associated with at least one selection by a user at the non-regulated device 140.

The non-regulated device 140 can be implemented using hardware or a combination of software and hardware. For example, each component of the non-regulated device 140 can include logical circuitry (e.g., a central processing unit or CPU) that responses to and processes instructions fetched from a memory unit (e.g., memory, storage device 106). Each component of the non-regulated device 140 can include or use a microprocessor or a multi-core processor. A multi-core processor can include two or more processing units (e.g., processor 104) on a single computing component. Each component of the non-regulated device 140 can be based on any of these processors, or any other processor capable of operating as described herein. Each processor can utilize instruction level parallelism, thread level parallelism, different levels of cache, etc. For example, the non-regulated device 140 can include at least one logic device such as a computing device having at least one processor 104 to communicate, for example, with one or more servers 102 and/or one or more user devices 160. The components and elements of the non-regulated device 140 can be separate components or a single component. The non-regulated device 140 can include a memory component (e.g., storage device 106) to store and retrieve content item 144, event information 116, and/or wager information 150. The memory 106 can include a random access memory (RAM) or other dynamic storage device, for storing information, and instructions to be executed by the non-regulated device 140. The memory 106 can include at least one read only memory (ROM) or other static storage device for storing static information and instructions for non-regulated device 140. The memory 106 can include a solid state device, magnetic disk or optical disk, to persistently store information and instructions.

The user device 160 can include a client device or a device associated with at least one user profile 120. The user device 160 can include, but is not limited to a computing device or a mobile device. The user device 160 can include or correspond to an instance of any client device, mobile device or computer device described herein. In embodiments, the user device 160 can be the same as or substantially similar to computer 800 of FIG. 8A. In some implementations, the user device 160 can implement, or perform, any of the functionality of the user device 460 detailed herein in connection with Section B of the present disclosure.

The user device 160 can be implemented using hardware or a combination of software and hardware. For example, each component of the user device 160 can include logical circuitry (e.g., a central processing unit or CPU) that responses to and processes instructions fetched from a memory unit (e.g., memory, storage device 106). Each component of the user device 160 can include or use a microprocessor or a multi-core processor. A multi-core processor can include two or more processing units (e.g., processor 104) on a single computing component. Each component of the user device 160 can be based on any of these processors, or any other processor capable of operating as described herein. Each processor can utilize instruction level parallelism, thread level parallelism, different levels of cache, etc. For example, the user device 160 can include at least one logic device such as a computing device having at least one processor 104 to communicate, for example, with one or more servers 102 and/or one or more user devices 160. The components and elements of the user device 160 can be separate components or a single component. The user device 160 can include a memory component (e.g., storage device 106) to store and retrieve content item 144, event information 116, and/or wager information 150. The memory 106 can include a random access memory (RAM) or other dynamic storage device, for storing information, and instructions to be executed by the user device 160. The memory 106 can include at least one read only memory (ROM) or other static storage device for storing static information and instructions for the user device 160. The memory 106 can include a solid state device, magnetic disk or optical disk, to persistently store information and instructions. In some embodiments, the user device 160 can include or deployed as, and/or be executed on any type and form of computing device, such as any desktop computer, laptop computer, or mobile device capable of communication over at least one network and performing the operations described herein.

The application 164 can include a user application executing on the user device 160 or provided to the user device 160 by the server 102. The application 164 can include a web application, a server application, resource, desktop and/or file. In embodiments, the application 164 can include local applications (e.g., local to a user device 160), hosted application, Software as a Service (SaaS) application, virtual application, mobile application, and other forms of content. In some embodiments, the application 164 can include or correspond to applications provided by remote servers or third party servers. In embodiments, the application 164 can access, through the link 134, the wager information 150 stored and maintained at the server 102 and generate a wager initiation actionable object 136 to a user through the user device 160. The wager initiation actionable object 136 can include a user-selectable hyperlink that initiates a process to generate a wager 154 using the wager information 150 and transmit the wager 154 from the user device 160, through the application 164, to the server 102. In embodiments, the wager initiation actionable object 136 can include a user-selectable hyperlink that initiates a process to transmit instructions to the server 102 to place a wager 154 using the wager information 150. In some embodiments, the wager initiation actionable object 136 can include a user-selectable hyperlink that initiates a process to download a webpage, additional wager information 150, odds 124 (e.g., updated odds, current odds), and/or registration information to register a user of the user device 160 in a contest.

In embodiments, one or more communication sessions 170 can be established between the user device 160, the server 102, the non-regulated device 140 and any combination of the user device 160, the server 102, or the non-regulated device 140. The session 170 can include a channel or connection between the user device 160 and the server 102, the user device and the non-regulated device 140, and/or the server 102 and the non-regulated device 140. The session 170 can include an application session (e.g., virtual application), an execution session, a desktop session, a hosted desktop session, a terminal services session, a browser session, a remote desktop session, a URL session and/or a remote application session. The session 170 can include encrypted and/or secure sessions. The encrypted session 170 can include an encrypted file, encrypted data or traffic.

Referring now to FIG. 1B, a table showing a representation of a wager history 123 for a user is provided. The table can be used to identify relationships between particular wagers, wagers types, and/or wager amounts made by a user. The wager history 123 can correspond to a wager history for a single user or multiple users. For example, the wager history 123 can be stored and maintained in a user profile 120 for a user or a group profile 122 for a group of users.

The table 123 includes a first column identifying the particular wager (e.g., wager A, wager B, etc.). The table 123 includes a second column identifying whether the wager was for a parlay bet or a single bet. The table 123 includes a third column identify a wager type (e.g., wager type 1, wager type 2, etc.) for a wager. In embodiments, the wager type can include, but not limited to, winning team, total points, moneyline bets, spread bets, or over/under bets. The table 123 can include a fourth column identifying whether the wager was a pre-game wager (e.g., before contest begins) or a live in-game wager (e.g., real-time wagers, play-byplay wagers). The table 123 includes a fifth column identifying wager amounts for the corresponding wager. The table 123 includes a sixth column identifying a time 126 that a wager was placed or entered.

The server 102 can generate content items 144 for a group of users based in part on a wager history 123 maintained for a group profile 122. The server 102 can use properties from the wager history 123 to determine betting patterns for a user or a group of users based in part on the wager history 123. In embodiments, the server 102 can determine that team A is included in multiple wagers placed by the user or group of users. The server 102 can identify the number of times the user or group of users has placed a particular type of wager and/or properties of the wagers placed by the user or group of users. For example, the server 102 can determine that a user places a first type of wager with the highest frequency and typically bets on the moneyline as a pregame wager. In embodiments, the server 102 can generate one or more content items 144 (e.g., bet recommendations) for the user or similar users for one or more events 116 scheduled to occur in a determined time period indicating a first type of wager based in part on the wager history 123.

In embodiments, the server 102 can determine that the non-regulated device 140 is located at an event 116 (e.g., stadium for a football game) and that a group of users 202 corresponding to fans of at least one team participating in the event 116 frequently place moneyline type wagers. The server 102 can generate a second or additional content items 144 indicating a moneyline bet as a pre-game wager. The server 102 can generate a third content item 144 or additional content items indicating a parlay wager using the moneyline as a pre-game wager. The number of content items 144 can vary and can be selected based at least in part on the properties of one or more events 116 and one or more wager histories 123.

Figure 2:
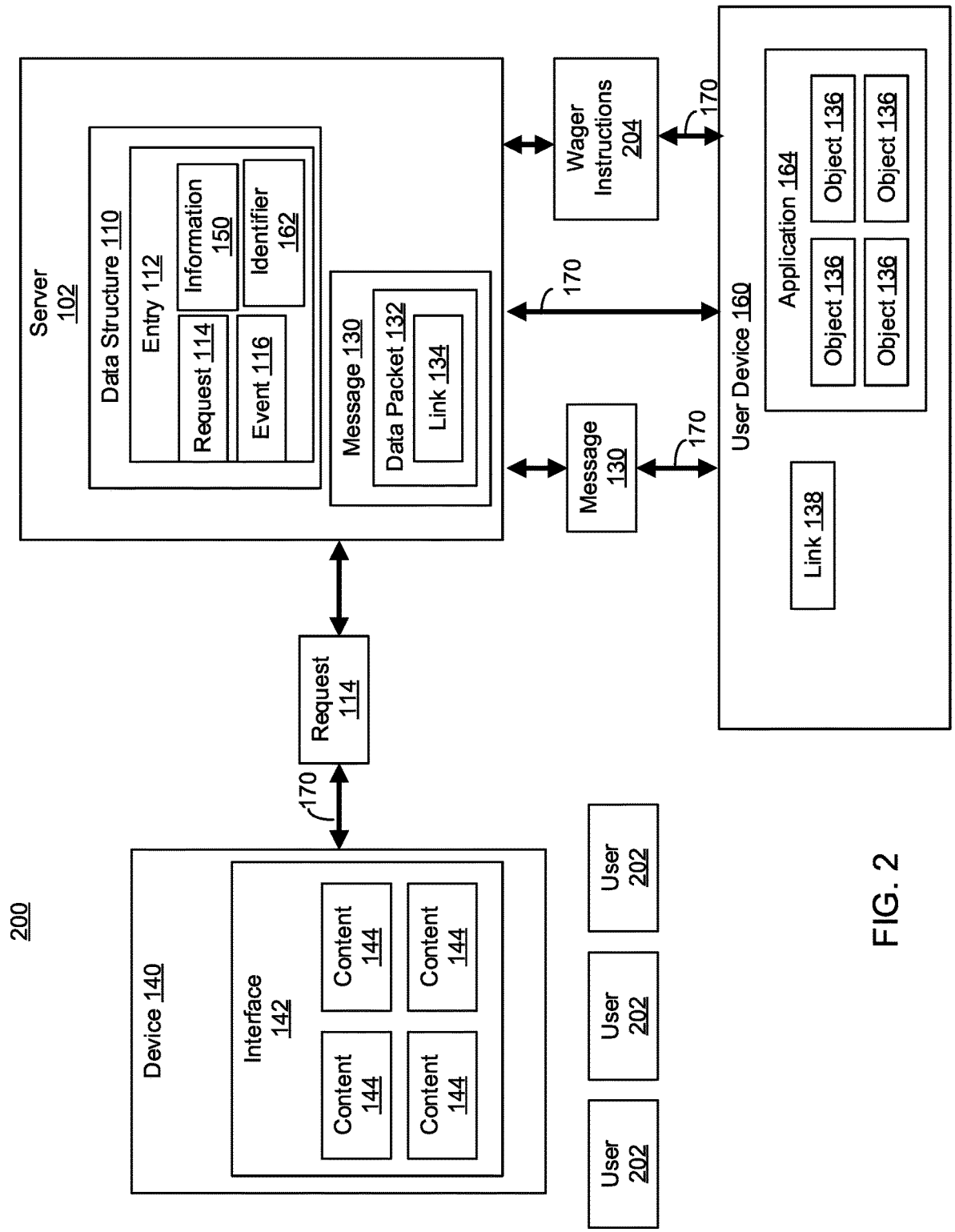
FIG. 2 is a block diagram depicting an embodiment of a network environment comprising a server in communication with one or more client devices.

Referring now to FIG. 2, depicted is a public venue 200 having a non-regulated device 140 positioned in a general area to display a plurality of content items 144 for a plurality of different users 202. The non-regulated device 140 can include a kiosk, terminal or public display that is accessible to each of the different users 202 and/or visible to the different users 202 to enable the users 202 to interact with and/or make one or more selections of the content items 144 provided through an interface 142 of the non-regulated device 140. In some embodiments, the non-regulated device 140 can include a television, display device, monitor, handheld computing device (e.g., iPad) or any type of device in which an application 164 can execute. The content items 144 can correspond to or represent one or more events 116, including but not limited to, sporting events that are scheduled to begin within a determined time period (e.g., in a few hours) or that are currently underway but not completed. The non-regulated device 140 can include a public device that allows users 202 to make selections of content items 144 without logging into the non-regulated device 140, registering with the non-regulated device 140 or providing user account information. The interface 142 of the non-regulated device 140 can include a touchscreen, interactive display or a display having one or more input devices to enable interaction with content items 144 displayed through the interface 142.

In some embodiments, the non-regulated device 140 can present offers or content items 144 associated with the public venue 200 the non-regulated device 140 is located at. For example, in one embodiment at a football stadium, the non-regulated device 140 can generate and display content items 144 associated with a football game about to begin and one or more potential outcomes in the football game. In embodiments, a first content item 144 can indicate a predicted winning team, a second content item 144 can indicate a predicted winning score, a third content items 144 can indicate a total score for the football game, and a fourth content item 144 can indicate a predicted half-time score in the football game. The number of content items 144 provided and the number of potential outcomes can vary, based at least in part on the type of event 116 and properties of the event 116.

In some embodiments, the server 102 can generate content items 144 for live or real-time betting. For example, the content items 144 can include or correspond to play-by-play betting. The server 102 can generate one or more content items 144 for display through a non-regulated device 140 for a particular play or series of plays (e.g., possession) within a current or live game. The server 102 can generate content items 144 once a sports contest begins (e.g., is underway, initiates) and can continue providing content items 144 during the sports contest, for example, through the non-regulated device 140. The server 102 can generate content items 144 for a particular scoring opportunity (e.g., goal, home run, touchdown, etc.) within a current or live game.

The server 102 can generate one or more content items 144 responsive to different occurrences that may occur during a sports event 116. For example, the server 102 can generate a first set of content items 144 before or as a sports event 116 begins. In embodiments, the first set of content items 144 can correspond to a first team to score a goal, a first player to hit a home run, or a first player to score a touchdown. After a first scoring occurrence or event (e.g., goal, home run, touchdown, etc.) occurs within the sports event 116, the server 102 can generate a second set of content items 144. The second set of content items 144 can be different from the first set of content items 144. In some embodiments, one or more content items 144 from the first set of content items 144 can be the same as one or more content items 144 from the second set of content items 144. After a second scoring occurrence or event (e.g., field goal, strike out, three point shot) occurs within the sports event 116, the server 102 can generate a third set of content items 144. The third set of content items 144 can be different from the first set of content items 144 and/or the second set of content items 144. In some embodiments, one or more content items 144 from the third set of content items 144 can be the same as one or more content items 144 from the first set of content items 144 and/or the second set of content items 144. The server 102 can continually and dynamically generate one or more content items 144 during a live sports contest or sports contest that is underway to provide live betting or play-by-playing.

The server 102 can continually and dynamically generate one or more content items 144 that are personalized for a user associated with a user profile 120 by using user attributes and/or other data stored in and/or associated with the user profile 120. The server 102 can rank and assign weights to each of the content items 144 provided to a user or previously selected by the user using a match score. In embodiments, the match score can indicate a likelihood that a user associated with the user profile 120 is likely to act upon, select, or engage with the content item 144 or a group of users (e.g., fans at a sports event, fans of the same team) associated with a group profile 122 are likely to act upon, select, or engage with the content item 144. The server 102 can identify and select a predetermined number of content items 144 (e.g., top three, top five, top ten) having the highest or greatest match score as compared to the other content items 144. The server 102 can provide, for example, through a non-regulated device 140, the predetermined number of content items 144 having the highest or greatest match score to provide a personalized set of real-time content items 144 to the respective user or group of users.

In embodiments, the server 102 or non-regulated device 140 can determine a position or location of one or more content items 144 within a display of the interface 142 of the non-regulated device 140 based in part on the match score. For example, content items 144 having a greater match score can be positioned having a greater prominence as compared to other content items 144 having a lower prominence. The server 102 or non-regulated device 140 can determine a positon of a first content item 144 having a first match score. The first match score can correspond to the highest or greatest match score as compared to match scores of other content items 144. The server 102 or non-regulated device 140 can select or assign a first position within the interface 142 having a greatest prominence. For example, the prominent position with the interface 142 can include, but not limited to, a top portion and/or a start of a list of the candidate recommendations. The prominence of a content item 144 can be modified using features of the display, such as a stylistic feature (e.g. a particular text style (which can specify a size, a font, underlining, bold, italics, or another style, and in some embodiments the style is different than the another style used for a different candidate recommendation), a visual indicator (e.g. a box, circle, or other visual indicator that surrounds or is otherwise positioned relative to the content item), or any other appropriate feature.

The server 102 or non-regulated device 140 can positon and/or display other content items 144 having less prominence or in a less prominent position within the display as compared to the content items 144 having a higher or greater match score. Thus, the content items 144 having the highest or greatest match score can be positioned and/or displayed with a greater prominence to increase a likelihood that one or more users associated with a group profile 122 are likely to act upon the content items 144 compared to the other content items 144 of the plurality of content items 144.

In some embodiments, the content items 144 can be generated based on an ongoing basis or based in part on an upcoming sporting event, for example, the public venue 200 that the non-regulated device 140 is located. The content item 144 can include or reference an outcome of the event 116 and include a likelihood (e.g., odds 124) of the presented outcome. In embodiments, the content items 144 can be generated in real-time based on a current score or game condition of one or more events 116. The content item 144 can include a media item (e.g. any combination of text, image, video, or user-interactive content), and the media item can reference a candidate content management selected by a server 102 based on a location of the non-regulated device 140 and a time value 128 (e.g., current time, time value for one or more events). In some embodiments, the content item can include an actionable object 136 that a user 202 can interact with to facilitate generating or placing a wager 154 or registering for a contest. For example, the actionable object 136 can include a user-selectable hyperlink that initiates a process to push a link 134 to a user device 160 that the user device 160 to download a webpage, or initiate a process of generating or placing a wager 154.

The users 202 can interact with the non-regulated device 140 to select content items 144 that correspond to potential wagers 154 that are then transferred to a user device 160 of the user, for example, through a server 102 (e.g., content server 102). For example, a user 202 can select a content item 144 provided through the interface 142 of the non-regulated device 140 and the non-regulated device 140 can generate a request 114 corresponding to the selection. The content item 144 can correspond to at least one event 116 and/or an outcome (e.g., winning team, total score) for the event 116 can include wager information 150 for the event 116 and/or outcome of the event 116. In embodiments, the non-regulated device 140 can receive or determine the wager information 150 responsive to the selection by the user 202 at the interface 142 and the wager information 150 can include, but is not limited to, one or more wager parameters 152 and a device identifier 162 of a user device 160 associated with the user 202.

In some embodiments, the user 202 can enter the device identifier 162 of the user device 160 when making the selection. In some embodiments, the user 202 can enter a phone number for the user device 160 (e.g., mobile phone) and the non-regulated device 140 and determine the device identifier 162 using the phone number. In embodiments, the user 202 can provide a user identifier associated with a user profile 120 for the user 202 and the non-regulated device 140 can use the user identifier to determine the device identifier 162 from the user profile 120. The non-regulated device 140 can generate and transmit the request 114 to provide the wager information 150 to the server 102. In embodiments, the request 114 can include the wager information 150, the event 116, the type of event 116, the device identifier 162, and/or a user identifier.

The server 102 can receive the request 114 from the non-regulated device 140 and create or update a data structure 110 or entry 112 for a data structure 110 to store the data included with the request 114. For example, the server 102 can store the wager information 150, the event information 116, the type of event 116, the device identifier 162, and/or a user identifier in at least one entry 112. The server 102 can include a content server having or hosting a plurality of contests or managing wagers 154 for a plurality of contests. In some embodiments, the server 102 can modify the wager information 150 to include one or more additional wager opportunities that are associated with the selected content item 144 from the non-regulated device 140. For example, the server 102 can update the wager information 150 to include one or more wager opportunities for the same event 116 that the user selected at the non-regulated device 140.

The server 102 can use the received wager information 150 to generate a message 130 for the user device 160 of the user 202. The server 102 generate the message 130 to include a link 134 to the wager information 150 stored at the server 102. In embodiments, the link 134 can include or correspond to a hyperlink that when interacted with or accessed causes a communications session 170 to be established to the respective device where the link 134 was accessed and the wager information 150 to be transmitted to the respective device where the link 134 was accessed. In embodiments, the server 102 can use the device identifier 162 to identify the user device 160 to transmit the message 130. In some embodiments, the server 102 can access a user profile 120 of the user 202 to identify the user device 160 to transmit the message 130.

The server 102 can transmit the message 130 to the user device 160 or multiple user devices 160 associated with the user 202. In embodiments, the user 202 can access or open the message 130 on the user device 160 and the link 134 can be displayed to the user 202. In some embodiments, the user device 160 can receive the message 130 and a window or prompt can open on the user device 160 to display the link 134.

The user device 160 can receive or detect an interaction with the link 134. For example, the user 202 can select, click-on, touch, and/or hover over for a determined time period the link 134 to access the link 134. The link 134 can include instructions or code that causes the user device 160 to establish a communications session 170 with the server 102 that transmitted the message 130. The link 134 can include instructions or code that causes, responsive to establishing the communications session 170, the user device 160 to access, retrieve or be provided the wager information 150 from the data structure 110 of the server 102. In some embodiments, the server 102 can receive an indication of an interaction with the link 134 at the user device 160 and transmit, provide or push the wager information 150 associated with the link 134 to the user device 160 through the communications session 170. In embodiments, the user device 160 can download the wager information 150 associated with the link 134 from the server 102 through the communications session 170. In some embodiments, the non-regulated device 140 and/or server 102 can perform a handshake with the user device 160 to transmit or provide the wager information to the user device 160.

The user device 160 can launch an application 164, for example, responsive to accessing the link 134. In some embodiments, the server 102 can provide the application 164 responsive to the interaction with the link 134. The application 164 can receive the wager information 150 and generate or display one or more wager initiation actionable objects 136 to the user 202 through the user device 160. The wager initiation actionable objects 136 can include or correspond to potential wager generated based in part on the wager information 150 and the selected content item 144 of the non-regulated device 140. For example, the wager initiation actionable objects 136 can indicate a predicted outcome for the event 116 associated with the selected content item 144 of the non-regulated device 140. In some embodiments, the wager initiation actionable objects 136 can indicate a predicted outcome (e.g., wager opportunity) for the user 202 to select to initiate or place a wager 154 at the server 102. The number of wager initiation actionable objects 136 presented can vary and be based at least in part on the number of content items 144 selected at the non-regulated device 140 and/or the wager information 150 received from the server 102. The wager initiation actionable objects 136 can indicate a type of wager, one or more wager amounts, odds 124, one or more teams' names, one or more outcomes, and/or a time value 128 for a corresponding wager 154. In some embodiments, the odds 124 included with the wager initiation actionable objects 136 can change or be different from the odds 124 of the content item 144 selected by the user 202 at the non-regulated device 140. For example, the odds 124 can change based in part on a time remaining in the event 116 and/or one or more occurrences (e.g., scoring event) during the event 116. The server 102 can verify or check the odds 124 and if the odds 124 have changed, the server 102 can provide the wager information 150 with the modified or changed odds 124 to the user device 160. The wager initiation actionable object 136 can indicate the modified or updated odds 124.

The user device 160 and/or application 164 can receive an indication of a selection of at least one the wager initiation actionable objects 136. The user device 160 can generate instructions 204 or commands identifying the selected wager initiation actionable objects 136, the type of wager, the selected or entered wager amount, odds 124, one or more teams' names, one or more outcomes, and/or the time 126 when the selection of the wager initiation actionable objects 136 was made. The instructions 204 can include instructions to place a wager 154 for the user 202 at the server 102 for the selected type of wager, odds 124 for the outcome, and/or the selected or entered wager amount. The user device 160 can transmit the wager instructions 204 to the server 12 through the communications session 170 for the server 102 to place or enter a wager 154 for the user based on the wager instructions 204. In embodiments, the server 102 can enter the wager 154 for the user using the wager instructions 204 for the selected type of wager, odds 124 for the outcome, and/or the selected or entered wager amount.

Thus, the user 202 can be provided a wager opportunity at the user device 160 (e.g., personal device) based on an interaction with a public non-regulated device 140. The interface 142 for a non-regulated device 140 can provide or include handoff technology to enable users 202 to generate or select wager opportunities at the non-regulated device 140 that are provided to personal devices 160 of the user 202 for confirmation and officially entering or placing.

Figure 3:
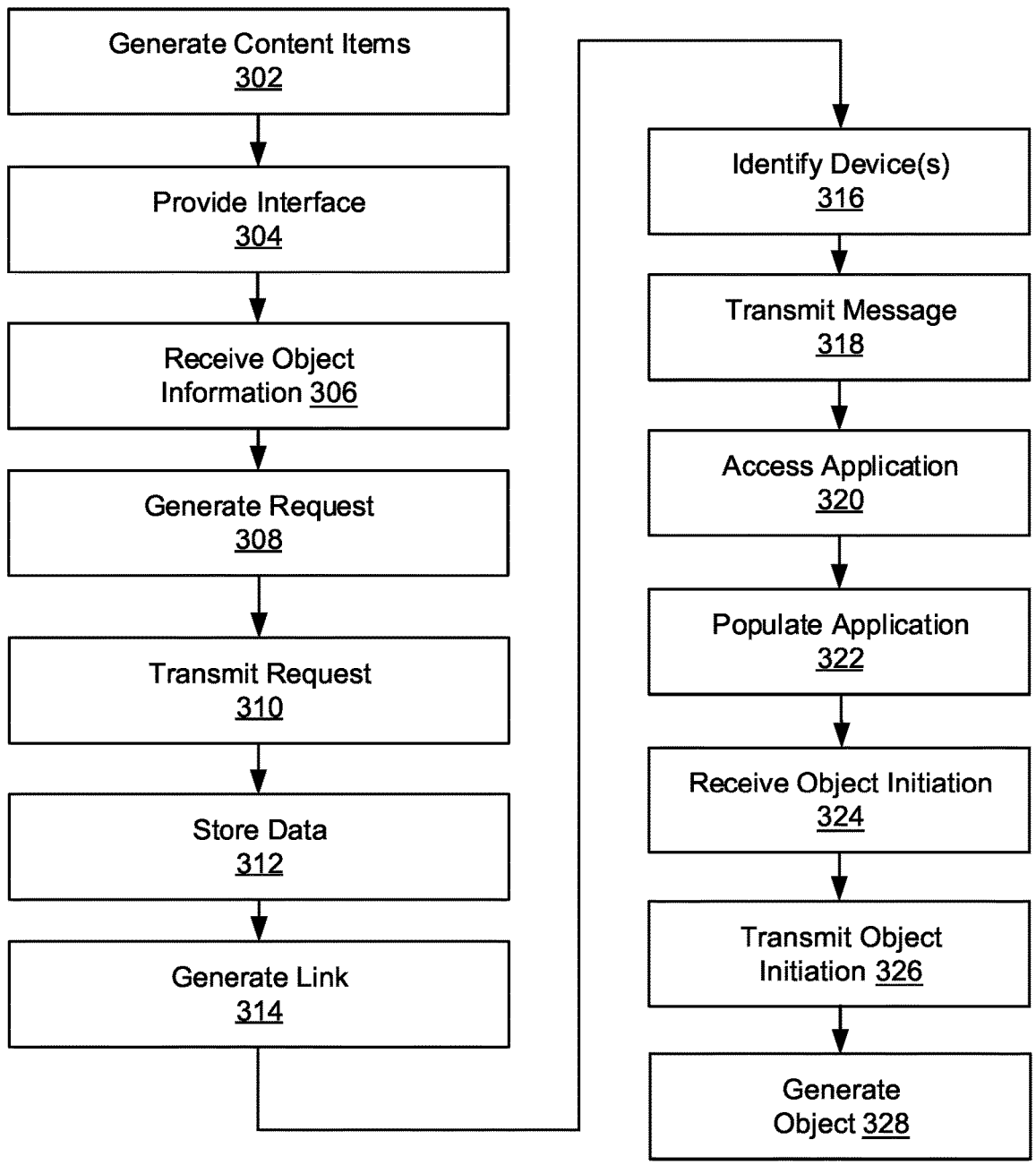
FIG. 3 is a flow diagram depicting one or more embodiments of a method for using a non-regulated device to generate wagers for placement via a regulated device.

Referring now to FIG. 3, depicted is a flow diagram of one embodiment of a method 300 for using a non-regulated device to generate wagers for placement via a regulated device. In brief overview, the method 300 can include one or more of: generating content items (302), providing an interface (304), receiving object information (306), generating a request (308), transmitting a request (310), storing data (312), generating a link (314), identifying a device (316), transmitting a message (318), accessing an application (320), populating an application (322), receiving an object initiation (324), transmitting the object initiation (326), and generating a data object (328). The functionalities of the method 300 may be implemented using, or performed by, the components detailed herein in connection with FIGS. 1A, 2, 4A, 5, 8A, and 8B.

Referring now to operation (302), and in some embodiments, one or more content items 144 can be generated. The content items 144 can be generated for display through a non-regulated device 140, such as in a public area or public venue. The content items 144 can include information or data associated with one or more events 116 (e.g., sporting contests, football games, golf tournaments). The content items 144 can include or identify one or more events 116 and wager information 150 for the one or more events 116. For example, the content items 144 can include an event 116 and odds 124 associated with one or more possible outcomes in the event 116 or during the course of the event 116 and types of wagers available to a user for the respective event 116. The content items 144 can be generated by the server 102 and transmitted to one or more non-regulated devices 140. In embodiments, the content items 144 can be generated by the non-regulated device 140.

Referring now to operation (304), and in some embodiments, an interface 142 can be provided. A first device 140 or non-regulated device 140 can provide the interface 142 having a plurality of content items 144 corresponding to one or more events 116 on which to place a wager 154. The non-regulated device 140 can generate or provide the user interface 142 to a plurality of different users (e.g., crowd, public venue) and the content items 144 can be displayed through the user interface 1042 of the non-regulated device 140. The content items 144 can be displayed based in a determined order, for example, based in part on a time 126 for the respective event 116 (e.g., chronological order), a type of sport, a type of wager, one or more teams involved, one or more players involved, or any combination of time 126 for the respective event 116 (e.g., chronological order), type of sport, type of wager, one or more teams involved, and one or more players involved. The non-regulated device 140 can assign a time value 128 to the one or more events 116 with each of the plurality of content items 144. The time value 128 can indicate an expiration date for the respective event 116. The time value 128 can be determined based in part on a scheduled start time for the event 116, duration value for the event 116 and/or end time for the event 116.

Referring now to operation (306), and in some embodiments, wager information 150 (e.g., object information) can be received. The first device 140 or non-regulated device 140 can receive, from a user via the interface 142 responsive to selection of one or more content items 144 of the plurality of content items 144, wager information 150 identifying an event 116 of the one or more events 116, one or more wager parameters 152 and a second device identifier 162 identifying a second device 160 (e.g., user device) of the user. The user interface 142 can present or provide the content items 144 as selectable objects that, responsive to a user interaction with the respective content item 144, an instruction or command can be generated to identify the content item 144 selected by a user, the event 116 associated with the content item 144 and wager information 150 selected by the user and/or associated with the event 116. The non-regulated device 140 can receive a single selection from a single user or multiple selections from multiple different users. In embodiments, the non-regulated device 140 can receive wager information 150 corresponding to selections made a plurality of different users. The wager information 150 can include, but is not limited to, a time value 128 indicating when the selection was made, a type of wager, a wager amount, a selected outcome, a type of event 116 (e.g., type of sporting event), one or more teams involved in the event 116, one or more players participating in the event 116, a device identifier 162 for one or more devices 160 associated with the user and/or a user profile 120 of the user.

Referring now to operation (308), and in some embodiments, a request 114 can be generated. The first device 140 or non-regulated device 140 can generate, responsive to receiving the wager information 150 via the interface 142, a request 114 to provide the wager information 150 to one or more servers 102. The request 114 can include a data structure including the wager information 150. In embodiments, the non-regulated device 140 can generate a request 114 for each selection received via the interface 142.

Referring now to operation (310), and in some embodiments, the request 114 can be transmitted. The first device 140 or non-regulated device 140 can transmit, to one or more servers 102, the request 114 to provide the wager information 150. The non-regulated device 140 can transmit the request 114 to at least one server 102 through a communications session 170 between the non-regulated device 140 and the server 102. In embodiments, the non-regulated device 140 can transmit the request 114 to the server 102 that the non-regulated device 140 received the content items 144, event information and/or wager information 150 from originally. In some embodiments, the non-regulated device 140 can select a server 12 from the one or more servers 102 and transmit the request 114 to the server 102 through a communications session 170 between the non-regulated device 140 and the server 102.

Referring now to operation (312), and in some embodiments, data can be stored. The server 102 can store the wager information 150 received with the request 114 in an entry 112 of a data structure 110, for example, in a memory 106 of the server 102. For example, the request 114 can include data that when received by the one or more servers 102, causes the one or more servers to store, in one or more data structures 110, an entry 112 including the wager information 150, generate a link 134 to the wager information 150 in the one or more data structures 110, and transmit a message 130 to the second device 160 or at least one user device 160 of the user using the second device identifier 162. In embodiments, the server 102 can generate or create a new entry 112 and/or new data structure 110 for the wager information 150 received with the request 114 responsive to receiving the request 114. In some embodiments, the server 102 can update or modify an existing new entry 112 and/or data structure 110 to include the wager information 150 received with the request 114 responsive to receiving the request 114.

Referring now to operation (314), and in some embodiments, a link 138 can be generated. The server 102 can generate a link 138 that points to or identifies the data structure 110 and entry 112 where the wager information 150 is stored and maintained. The link 138 can include a hyperlink or reference to the wager information 150. In some embodiments, the link 138 can include a code or script that causes a user device 160 to launch an application 164 at the respective user device 160 or to receive (e.g., download) an application 164 and launch the application 164 at the respective user device 160. In embodiments, the server 102 can generate the link 138 responsive to receiving the request 1114 and storing the wager information 150 in the entry 112 of the data structure 110.

Referring now to operation (316), and in some embodiments, a device 160 can be identified. The server 102 can identify a user device 160 associated with the user or associated with a user profile 120 for the user. The server 102 can use the device identifier 162 included with the request 114 to identify one or more user devices 160 associated with the user. For example, the server 102 can use the device identifier 162 to identify the user device 160 for the user. In some embodiments, the server 102 can use the device identifier 162 to parse or search a plurality of user profiles 120 to identify the user and/or the user profile 120 associated with the user. The server 102 can access the identified user profile 120 to identify the correct or appropriate device 160, for example, to transmit a message 130 including the link 138.

Referring now to operation (318), and in some embodiments, a message 130 can be transmitted. The server 102 can transmit a message 130 to the user device 160 of the user through a communication sessions 170 between the server 102 and the user device 160. The server 102 can generate the message 130 to include the link 134, the device identifier 162 for the receiving user device 160 and/or an identifier for the user that made the initial selection. The server 102 can generate the message 130 to include one or more data packets 132 and the data packets 132 can include the link 134 and a device identifier 162 for the secondary device 160 of the user in a payload portion of the one or more data packets 132. In some embodiments, the message 130 can indicate or identify the non-regulated device 140 the original selection was made, a time value 128 indicating when the selection was made and/or the content item 144 selected or interacted with at the non-regulated device 140. The user device 160 can receive the message 130 including the link 134 associated with the data structure 110 generated at the server 102 and/or generated at the nonregulated device 140. In embodiments, the data structure 110 can include or identify the wager information 150, event information associated with at least one content item 144 selected at the interface 142 of the nonregulated device 140 by a user 202 of the user device 160.

Referring now to operation (320), and in some embodiments, an application 164 can be accessed. In embodiments, the message 130 can include the link 134, which when accessed via the second device 160 (e.g., user device 160), causes the second device 160 to launch an application 164 executable on the second device 160 that is configured to establish a communication session 170 with the one or more servers 102 and access the wager information 150 stored in the one or more data structures 110 via the communication session 170 and present a wager initiation actionable object 136 configured to cause the second device 160 to transmit instructions 204 to the one or more servers 102 to place a wager 154 using the wager information 150. In embodiments, the server 102 can perform a handshake with the secondary device 160 responsive to the interaction with the link 134 at the secondary device 160 to transmit the data structure 110 to the secondary device 160 from the server 102. In some embodiments, the non-regulated device 140 can perform a handshake with the secondary device 160 responsive to the interaction with the link 134 at the secondary device 160 to transmit the data structure 110 to the secondary device 160 from the interface 142 of the non-regulated device 140. The user device 160 can receive the message 130 and a prompt, menu or window can be presented to a user of the user device 160 through a display of the user device 160. The user device 160 can display or provide the link 134 through the display and responsive to an interaction (e.g., select, click-on, touch, hover) with the link 134, the user device 160 can launch and access the application 164. The user device 160 can detect the interaction with the link 134. In some embodiments, responsive to an interaction with the link 134, the user device 160 can receive, download or access the application 164 from the server 102.

Referring now to operation (322), and in some embodiments, the application 164 can be populated. In embodiments, the user device 160 can launch the application 164 and populate one or more fields of the application to include the information in the data structure 110 and display the wager information 150 to a user through the application 164. In some embodiments, the application 164 can be populated to include or present the wager information 150 responsive to establishing the communications session 170 with the server 102 and launching the application 164. For example, the application 164 can launch on the user device 160 and can include a script or code to receive or download the wager information 150 from the server 102 and populate (e.g., auto-populate) one or more fields of the application 164 to display the wager information 150. The application 164 can present or display one or more wager initiation actionable objects 136 to a user of the user device 160. The wager initiation actionable objects 136 can correspond to or represent opportunities for the user generated based on the wager information 150 accessed from the server 102. The wager initiation actionable objects 136 can correspond to or be associated with one or more outcomes of an event 116 and include odds 124 associated with the respective outcome occurring. In some embodiments, the wager initiation actionable objects 136 can include or correspond to wagers or betting opportunities for an event 116. The wager initiation actionable objects 136 can include selectable content, for example, that in response an interaction with the respective wager initiation actionable object 136, causes the second device 160 to transmit instructions 204 to the server 102 to place a wager 154 using the wager information 150 or a portion of the wager information 150 represented by the wager initiation actionable object 136. In some embodiments, the non-regulated device 140 can transmit, responsive to the interaction with the link 134 at the secondary device 160, the data structure 110 from the interface 142 to the secondary device 160.

In embodiments, the user device 160 can update or modify odds 124 associated with an event 116 based in part on a time 126 of the event 116 (e.g., time remaining in the event) or current time 126. The odds 124 can be updated to reflect a current probability of an outcome associated with the odds 124 occurring based in part on the time 126 of the event 116 and one or more conditions (e.g., current score, player statistics, team statistics) of the event 116. For example, the user device 160 can modify, responsive to the interaction with the link 138 at the secondary device 160 or user device 160, odds 124 associated with the event 116 using a time 126 of the interaction and a time 126 of the at least one content item 144. The time of the content item 144 can include or correspond to a time remaining in the event 116 represented by the content item 144. In embodiments, the user device 160 can determine if the odds 124 have changed, for example, from a time 126 that the user selected the content item 144 at the non-regulated device 140 to the time 126 of the interaction with the link 138 at the user device. If the odds 124 have not changed, the user device 160 can provide the odds 124 for one or more outcomes associated with the event 116 for selection by the user of the user device through one or more wager initiation actionable objects 136. If the odds 124 have changed, the user device 160 can update the odds 124 to reflect the current or most recent odds 124 for one or more outcomes associated with the event 116. The user device 160 can provide the modified odds 124 116 for selection by the user of the user device through one or more wager initiation actionable objects 136.

Referring now to operation (324), and in some embodiments, a wager initiation (sometimes referred to herein as an "object initiation") can be received. The user device 160 can receive an indication of an interaction with at least one wager initiation actionable object 136 or multiple wager initiation actionable objects 136. The user device 160 can identify the wager information 150 linked with or associated with the wager initiation actionable object 136 and generate instructions 204. The instructions 204 can include a command, code or indication of wager information 150 to be used to generate a wager 154 when received at the server 102. In some embodiments, the user device 160 can generate a wager 154 using the wager information 150 linked with or associated with the selected wager initiation actionable object 136.

Referring now to operation (326), and in some embodiments, instructions 204 can be transmitted. The user device 160 can transmit instructions 204 to the server 102 to place a wager 154 using the wager information 150 or a portion of the wager information 150 represented by the wager initiation actionable object 136. In embodiments, the user device 160 can transmit multiple sets of instructions 204 to the server 102 to place multiple wager 154 using the wager information 150 with each set of instructions 204 corresponding to at least one selected wager initiation actionable object 136 and at least one wager 154. The instructions 204 can include a type of wager, a wager amount (or multiple wager amounts), a time 126 the wager initiation actionable object 136 was selected, a type of event 116, a team name, a contest name and/or an outcome. In some embodiments, the user device 160 can transmit the wager 154 to be processed at the server 102. The wager 154 can include or identify a type of wager, a wager amount (or multiple wager amounts), a time 126 the wager initiation actionable object 136 was selected, a type of event 116, a team name, a contest name and/or an outcome.

Referring now to operation (328), and in some embodiments, the data object can be generated. The server 102 can receive the instructions 204 from the user device 160 and generate a wager 154 (e.g., generate a data object) using the wager information 150 or a portion of the wager information 150 indicated by the instructions 204. The server 102 can generate the wager 154 based in part on the time value 128 of when the wager initiation actionable object 136 was selected at the user device 160 via the application 164. The server can generate the wager based in part on the odds 124 for an outcome of the event 116 represented by the wager information 150 and the time value 128. In embodiments, the server 102 can generate a wager 154 for each set of instructions 204 received form the user device 160 or from multiple user devices 160. The server 102 can generate the wager 154 to include or identify a type of wager, a wager amount (or multiple wager amounts), a time 126 the wager initiation actionable object 136 was selected, a type of event 116, a team name, a contest name and/or an outcome.

In some embodiments, the server 102 can receive the wager 154 from the user device 160 and process or enter the wager 154, for example, in a contest or central contest database to officially enter the wager 154. In embodiments, the server 102 can update the user profile 120 for the user to include or indicate the wager 154 and the associated wager information 150. For example, the server 102 can update the data structure 110 to include a device identifier 162 for the secondary device 160 of the user responsive to the interaction with the link 134 from the secondary device 160 and provide the updated data structure 110 for a user profile 120 maintained at the server 102 for the user of the secondary device 160. In some embodiments, the server 102 can update a group profile 122 that the user profile 120 for the user is included within to include or indicate the wager 154 and the associated wager information 150. The server 102 can transmit a notification to the user device 160 indicating that the wager 154 has been processed and is active.

B. Systems and Methods for Providing Wager Recommendations Based on Streaming Data At least one other aspect of the present disclosure is directed to systems and methods of providing content items based on streaming data or television content. The content items can be provided, for example, in accordance with any of the functionalities described herein above in conjunction with Section A. For example, recommendations can be presented in streaming data that is provided to a television, set-top box (e.g., a cable-box or node 450, etc.), or other type of user device (sometimes referred to as a "broadcast receiver device," which can receive broadcast content such as cable television, satellite streams, or other content streams) as described in this section. Any of the techniques described herein can be provided in this section can similarly be performed by the computing devices described herein above in Section A.

Content can be streamed to end user devices via set top boxes or display devices. The content can include real-time events, such as sporting events. Content providers and other third-party services may wish to engage with such users while they are watching or consuming the streamed content.

Figure 4A:
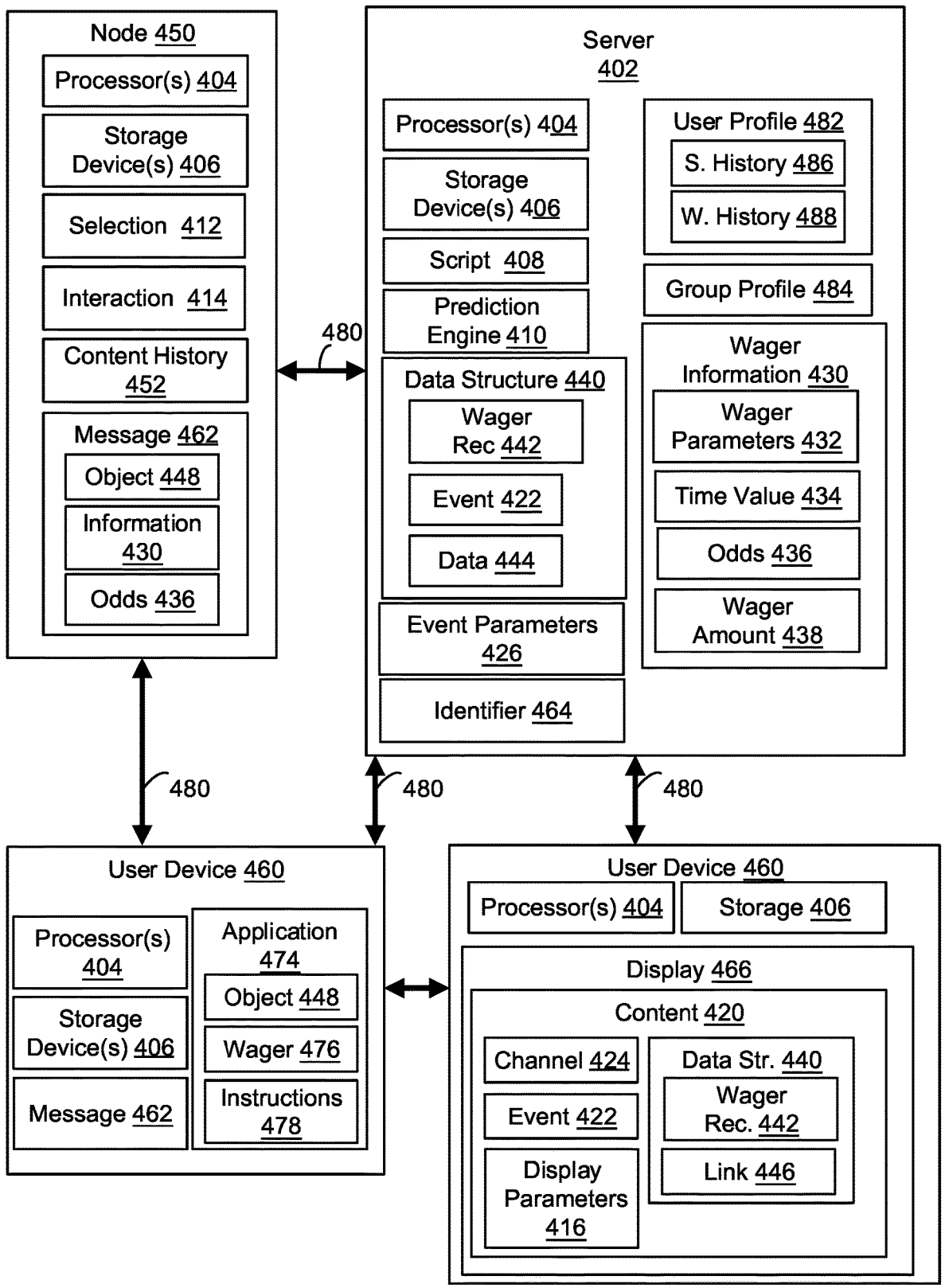
FIG. 4A is a block diagram depicting an embodiment of a network environment for providing wager recommendations based on streaming data.

Referring now to FIG. 4A, depicted is an environment 400 having a server 402, a node 450 and one or more user devices 460. The node 450 can provide or stream content 420 to a first user device 460 including one or more events 422 (e.g., sports games, football games) and generate or provide a data structure 440 for the first user device 460 having one or more wager recommendations 442 (which may be, or include, content items) generated based in part on the current event 422 being displayed through the first user device 460 and/or one or more events 422 available to be displayed through the first user device 460. In embodiments, a server 402 (e.g., content server 402) can provide the data structure 440 and one or more wager recommendations 442 to the node 450 for display through the first user device 460. For example, in one embodiment, the node 450 can include or correspond to a network hub or television streaming server that provides television content 420 to the first user device 460 and the first user device 460 can include a television or computing device connected to the streaming service. The node 450 can stream television content 420 to the first user device 460 including one or more sporting events 422 and provide wager recommendations 442 displayed concurrent with the events 422 to provide wager opportunities (e.g., content items) for a user of the user device 460 based in part on a current or active event 422 the user is respectively watching or accessing through the first user device 460. The wager recommendations 442 can be provided with a link 446 that enables a user to interact with or select a wager recommendation 442. The node 450 can detect the selection of the wager recommendation 442 and transmit a message 462 to a second, different user device including a wager initiation actionable object 448 for the user to place a wager 476 (where placing a wager is sometimes referred to herein as "generating a data object," and where wagers are sometimes referred to as "data object(s)") through a client application 474 of the second user device 460. In embodiment, the user can interact with the content 20 and events 422 provided at the first user device 460 to make selections or request information to place a wager via a client application 474 executing on a second user device 460.

The environment 400 can include a cloud computing environment. The cloud computing environment 400 may be public, private, or hybrid. Public clouds may include public servers that are maintained by third parties to one or more user devices 460 or the owners of one or more user devices 460. The servers may be located off-site in remote geographical locations as disclosed above or otherwise. Public clouds may be connected to the servers over a public network. Private clouds may include private servers that are physically maintained by one or more user devices 460 or owners of one or more user devices 460. Private clouds may be connected to the servers over a private network. Hybrid clouds may include both the private and public networks and servers. In embodiments, the environment 400 can be the same as or substantially similar to network 570 or cloud 575 of FIG. 5B.

The server 402 can include a content server configured to generate wager recommendations 442 (e.g., content items) and wager information 430 (where wager information is sometimes referred to herein as "object information"). The server 402 can generate the wager recommendations 442 based in part on the wager information 430, wager parameters 432 (where wager parameters are sometimes referred to herein as "object parameter(s)"), a time value 434 of an event 422, odds 436, and/or a wager amount 438. The server 402 can be implemented using hardware or a combination of software and hardware. For example, each component of the server 402 can include logical circuitry (e.g., a central processing unit or CPU) that responses to and processes instructions fetched from a memory unit (e.g., memory, storage device 406). Each component of the server 402 can include or use a microprocessor or a multi-core processor. A multi-core processor can include two or more processing units (e.g., processor 404) on a single computing component. Each component of the server 402 can be based on any of these processors, or any other processor capable of operating as described herein. Each processor can utilize instruction level parallelism, thread level parallelism, different levels of cache, etc. For example, the server 402 can include at least one logic device such as a computing device having at least one processor 404 to communicate, for example, with the node 450 and one or more user devices 460. The components and elements of the server 402 can be separate components or a single component. The server 402 can include a memory component (e.g., storage device 406) to store and retrieve wager recommendations 442, wager information 430, wager parameters 432, and/or odds 436. The memory 406 can include a random access memory (RAM) or other dynamic storage device, for storing information, and instructions to be executed by the server 402. The memory 406 can include at least one read only memory (ROM) or other static storage device for storing static information and instructions for the server 402. The memory 406 can include a solid state device, magnetic disk or optical disk, to persistently store information and instructions. In some embodiments, the server 402 can include or deployed as, and/or be executed on any type and form of computing device, such as any desktop computer, laptop computer, or mobile device capable of communication over at least one network and performing the operations described herein. In embodiments, the server 402 can be the same as or substantially similar to computer 800 of FIG. 8A or server 895 of FIG. 8B. In some implementations, the server 402 can implement, or perform, any of the functionalities of the server 102 detailed herein in connection with Section A of the present disclosure.

The server 402 can provide a script 408 to a node 450. The script 408 can include a command, code, automation tool, program or set of instructions for determining wager information 430 and/or generating wager recommendations 442. The script 408 can reference or point to a database (e.g., storage device 406 of server 402) for retrieving or accessing data and wager information 430 (e.g., odds 436) associated with wager recommendations 442 for one or more events 422. The script 408 can include instructions for determining wager parameters 432, odds 436 and/or wager amounts 438 for one or more events 422. In some embodiments, the script 408 can include a link or command to access or request wager information 430 and/or generating wager recommendations 442 from the server 402. In embodiments, the script 408 can cause the node 450 to establish a communications session 480 between the node 450 and the server 402. In some embodiments, a script 408 can be provided to a user device 460 to monitor and detect content 420 streamed, accessed or provided to the user device 460 by the node 450. In embodiments, the script 408 can cause the user device 460 to establish a communications session 480 between the user device 460 and the node 450 and/or between the user device 460 and the server 402.

The server 402 can maintain one or more user profiles 482, for example, for a plurality of different users. In embodiments, each user profile 482 can be linked with or associated with at least one user. In some embodiments, a user profile 482 can be generated for a user responsive to a registration process, log-in attempt and/or responsive to a first interaction with the server 402 and/or client application 474 via a user device 460. The user profile 482 can include a data structure or entry in a database of the memory 406 of the server 402 for storing and maintaining one or more previous wagers 476, one or more previously selected wager recommendations 442, wager information 430, wager parameters 432, one or more watched events 422, event parameters 426, one or more user devices 460 associated with the user and/or a streaming history 486 for the user. For example, the user profiles 482 can include the history 486 indicating the type content 420 and/or events 422 one or more user devices 460 of the user have accessed or received from the node 450. The history 486 can include historical data or previous wagers 476, selections or interactions made by the user via one or more user devices 460 and the node 450. The history 486 can include a history of televisions shows, television content 420 and/or third party content 420 accessed by one or more user devices 460 via the node 450. In embodiments, the user profile 482 can include a wager history for the user. In some embodiments, the server 402 can receive or access the content history 452 of the node and update the streaming history 486 for a user in the respective user profile 482. In embodiments, the user profile 482 can include a wager history 488 identifying one or more previous wagers 476 placed by a user and wager information 430 associated with the wagers 476. The wager history 488 can indicate relationships between particular wagers, wagers types, and/or wager amounts made by a user. The user profile 482 can include user preferences including, but not limited to, hometown, location, favorite sports teams, favorite sports, favorite athletes, and/or favorite types of wagers.

The server 402 can maintain one or more group profiles 484. The group profile 484 can include a group of users or group of user profiles 482 having similar user preferences, historical data, previous wagers, selections and/or interactions with the server 402, node 450 and/or one or more user devices 460. The group profile 484 can include a group of users or group of user profiles 482 participating in or active in the same contest, watching the same event 422, and/or placing wagers 476 on the same event 422. The group profile 484 can include or link together a plurality of user profiles 482 for a plurality of different users, for example, to recommend or identify wager recommendations 442 for the members of the group profile 484 based in part on the data associated with the other members of the group profile 484. In embodiments, the group profile 484 can include a wager history for the group of users.

The server 402 can generate one or more data structures 440 that include one or more wager recommendations 442 corresponding to one or more potential outcomes for an event 422 or occurrences during an event 422. In embodiments, the wager recommendations 442 can include potential wager opportunities for an event 422, including but not limited to, a winning team, a total points scored in the event, a total points by one team, an over/under bet, a moneyline bet, straight bet, total line bet, or parlay bet. The server 402 can generate or provide odds 436 for a wager recommendation 442. The odds 436 can correspond to a probability that a particular outcome will occur. The odds 436 can include or refer to a measure of the likelihood of a particular outcome in an event 422. In embodiments, the odds 436 can be calculated or determined as a ratio of a number of events or occurrences during an event 422 that produce a particular outcome versus the number of events or occurrences during the event 422 that don't produce the particular outcome. The odds 436 can be based in part on generated based in part on a time value 434 (e.g., time remaining) in a particular event 422. In some embodiments, the server 402 can receive or access the odds 436 from a third party server or third party application.

Wager information 430 can include one or more teams participating in an event 422, one or more players participating in an event 422, a time value 434 for the event 422, a score of the event 422, odds 436 associated with one or more potential outcomes of an event 422, a wager amount 438, and/or a payout amount. Wager parameters 432 can include, but are not limited to, a type of wager 476, a wager amount, a time associated with the wager 476 (e.g., when wager was placed), one or more teams included in the wager 476, a contest name, an outcome, a time when a selection was made, a time when a wager 476 was placed, a type of sport, a type of contest, odds 436 associated with the event 422, and/or odds 436 associated with the wager 476.

A time value 434 can include a time stamp, a time range, a time period or a particular point in time. In embodiments, the time value 434 can indicate a time of an interaction (e.g., with a link, with a content item), a time remaining in an event 422, a start time for an event 422, a duration for an event 422, or an end time for an event 422. In some embodiments, the time value 434 can include or represent an expiration date for an event 422. The time value 434 can indicate when the event 422 expires and/or when an opportunity to place a wager 476 on the event 422 expires. A wager amount 438 can include an amount placed on a wager 476. The wager amount 438 can be pre-generated by the server 402 and assigned to a wager recommendation 442 and/or wager initiation actionable object 448. In embodiments, the wager amount 438 can be entered or provided by a user, for example, through a client application 474 executing on a user device 460 for a wager recommendation 442 and/or wager initiation actionable object 448 to be assigned to a wager 476.

The event 422 can include a contest, sporting event, or any type of event that a user can place a wager on or bet on. For example, the event 422 can include a contest that one or more users can register for to participate in (e.g., registrants). The event 422 can include or refer to, but is not limited to, a football game, basketball game, a soccer match, golf tournament, baseball game, an e-sports event (e.g. a video game or computer game contest), or any type of sporting contest. The event 422 can include sporting events that are scheduled within a determined time period (e.g., planned but not started yet) and/or active sporting events that are underway (e.g., have started or begun) but have not completed yet. The event 422 can include one or more parameters. The event parameters 128 can include, but are not limited to, a type of wager 154, a wager amount, a team name, a contest name and/or an outcome. The event parameters 128 can include, but are not limited to, a time when a selection was made, a time when a wager 476 was placed, a type of sport, a type of contest, odds 436 associated with the event 422, and/or odds 436 associated with the wager 476.

In some embodiments, the server 402 can generate the wager recommendations 442 and/or wager information 430 based in part on data received from one or more data sources. The data sources can include a game server that provides real-time updates to live sporting events, one or more servers of sportsbooks or other servers that generate odds or lines for live sporting events, among others. For example, the server 402 can be in communication with one or more third party servers that periodically provide data that the server 402 can use to generate one or more wager recommendations 442 and/or wager information 430 and/or update one or more wager recommendations 442 and/or wager information 430. The data provided to the server 402 can include a plurality of possible future outcomes for one or more sporting events 422, including but not limited to future outcomes pertaining to individual players, teams, or multiple teams. In addition, the data can include a current value that is based on a likelihood that a particular future outcome will occur based on a current status of one or more sporting events 422. In some such embodiments, the server 402 can establish and maintain a communication channel with the one or more third-party servers and utilize a recommendation policy that enables the server 402 to access the data maintained by the one or more third-party servers, including the data the server 402 can use to generate one or more wager recommendations 442 and/or wager information 430. In some embodiments, the server 402 can be configured to perform one or more functions of the third-party servers, including but not limited to dynamically generating one or more wager recommendations 442 and/or wager information 430 based on a likelihood that particular future outcomes will occur based on a current status of one or more sporting events 422.

The wager recommendations 442 can be generated to include a link 446 or be associated with at least one link 446. The link 446 can include a hyperlink, uniform resource locator (URL) or reference to one or more user devices 460 associated with a user. The link 446 can indicate or identify a user device 460 of a user or associated with a user profile 482 for a user. In embodiments, the link 446 can be configured to cause then node 450 and/or server 402 to establish or request a communication session 480 with at least one user device 460. In some embodiments, the link 446 can be configured to cause the node 450 and/or server 402 to transmit a message 462 to at least one user device and present a wager initiation actionable object 448 to the user device 460.

The server 402 can include a prediction engine 410. The prediction engine 410 can generate predictions and probabilities (e.g., odds 436) on future outcomes for one or more events 422. The prediction engine 410 can use data for an event 422 including, but not limited to, the teams involved, players involved, time of the event 422, and/or time remaining in the event 422. In embodiments, the prediction engine 410 can generate odds 436 for one or more outcomes (e.g., final score, points scored by each team, winning team) of an event 422. The prediction engine 410 can generate data that indicates that an outcome or feature of the real sports event 422 being above, equal to, or below a threshold. The prediction engine 410 can generate data that indicates odds 436 a particular outcome may be achieved if one or more players or one or more teams scores a predetermined number of points, or achieves a pre-determined number of instances of an objective (e.g. touchdowns), or if at least a predetermined total number of points is scored in a game (an "over/under" for a game point total), or if another objective is achieved (e.g. a shutout), or some combination of the above. The prediction engine 410 can assign weights to one or more outcomes that is indicative of a strength or likelihood of the outcome occurring. The weights may be determined in any appropriate manner, including by a machine-learning algorithm trained on a training data set. The term "machine-learning algorithm" can be used herein to refer to an algorithm determined by a process including machine learning (e.g. a machine-trained algorithm).

In embodiments, the prediction engine 410 can determine a real-time event status for one or more events 422. The real-time event status can relate to any real-time condition, status, or action of a real event 422. For example, the real-time event status can indicate whether a game is close (e.g. whether a score difference between two teams is equal to or smaller than a threshold), or whether a prediction on a future outcome of the event 422 is close to being satisfied (e.g. whether a total number of points in a game is close to a total number of points corresponding to an over-under prediction on a future outcome (e.g. within a threshold of the over-under)). Such thresholds can be determined based on a time value 434 (e.g. a time since the start of the event or game, or a time remaining in the event or game). For example, a first threshold may be implemented for a remaining time that falls within a first predetermined range (e.g. a second-to-last quarter of total game time), and a second threshold may be implemented for a remaining time that falls within a second predetermined range (e.g. e.g. a last quarter of total game time). The second threshold may be smaller than the first threshold. Thus, the server 402 can account for time remaining in an event 422 when determining whether the prediction on a future outcome associated with the event 422 is close to being satisfied. The real-time status can indicate or can be that a game is close or not (e.g. a binary indication), or can indicate or can be a degree of closeness (e.g. based on a difference between the scores of two teams or a difference between a point total and an under/under line). In embodiments, the real-time event status of an event 422 can relate to whether one or more points were just scored in a game, or if a team is in a "red-zone" or has been awarded a penalty shot, or if a remaining game time is equal to or below a threshold (or if a time since the start of the game is equal to or above a threshold). An event 422 may have one or more real-time statuses.

The server 402 can generate one or more scripts 408 to provide to the node 450. A script 408 can include a command, code, automation tool, program or set of instructions for determining wager information 430 and/or generating wager recommendations 442. The script 408 can reference or point to a database (e.g., storage device 406 of server 402) for retrieving or accessing data and information associated with wager recommendations 442 for one or more events 422. The script 408 can include instructions for determining wager parameters 432, odds 436 and/or wager amounts 438 for one or more events 422. In some embodiments, the script 408 can include a link or command to access or request wager information 430 and/or generating wager recommendations 442 from the server 402.

The node 450 can include a server, network node, streaming service or television content provider. In some embodiments, the node 450 can include a network hub or television streaming server that a user device 460 connects to for access to television content, streaming services and/or one or more third party application content. In one embodiment, the node 450 can provide television content 420 to a first user device 460 (e.g., user television, computing device connected to the streaming service) and the node 450 can stream television content 420 to the first user device 460 including one or more sporting events 422 based in part on one or more channels 424 accessed or selected by the user at the first user device 460.

The node 450 can be implemented using hardware or a combination of software and hardware. For example, each component of the node 450 can include logical circuitry (e.g., a central processing unit or CPU) that responses to and processes instructions fetched from a memory unit (e.g., memory, storage device 406). Each component of the node 450 can include or use a microprocessor or a multi-core processor. A multi-core processor can include two or more processing units (e.g., processor 404) on a single computing component. Each component of the node 450 can be based on any of these processors, or any other processor capable of operating as described herein. Each processor can utilize instruction level parallelism, thread level parallelism, different levels of cache, etc. For example, the node 450 can include at least one logic device such as a computing device having at least one processor 404 to communicate, for example, with one or more servers 402 and/or one or more user devices 460. The components and elements of the node 450 can be separate components or a single component. The node 450 can include a memory component (e.g., storage device 406) to store and retrieve wager recommendations 442 and/or wager information 430. The memory 406 can include a random access memory (RAM) or other dynamic storage device, for storing information, and instructions to be executed by the node 450. The memory 406 can include at least one read only memory (ROM) or other static storage device for storing static information and instructions for node 450. The memory 406 can include a solid state device, magnetic disk or optical disk, to persistently store information and instructions.

In embodiments, the node 450 can receive a script 408 from the server 402 and generate and provide wager recommendations 442 using the script and displayed concurrent with an event 422 through a display 466 of a user device 460. The node 450 can execute the script 408 to generate wager opportunities based in part on a current or active event 422 the user is respectively watching or accessing through the user device 460. The node 450 can generate a message 462 to provide a user device 460 one or more wager initiation actionable objects 448 and wager information 430 associated with at least one wager recommendation 442 selected at a user device 460. The message 462 can include a data structure, data packet, script, code, instruction or command. In embodiments, the message 462 can include one or more wager initiation actionable objects 448 and wager information 430 to enable a user to interact with and/or select at least one wager initiation actionable object 448.

The node 450 can detect a selection 412 (e.g., user selection) and/or an interaction 414 at one or more user devices 460. In some embodiments, the script 408 can detect a selection 412 (e.g., user selection) and/or an interaction 414 at one or more user devices 460 and provide an indication of the selection 412 or interaction 414 to the node 450 and/or server 402. The selection 412 can include a selection 412 of a channel 424 at the user device 460, a selection of a wager recommendation 442, and/or a selection of a wager initiation actionable object 448. The interaction 414 can include an interaction with content 420 at the user device 460, interaction with a wager recommendation 442, and/or interaction with a wager initiation actionable object 448. The interaction 414 can include a user interaction, a user selection 412 and/or a change to the event 422 provided to the user device 460. In some embodiments, the interaction 414 can include, but is not limited to, a change in the content 420, a change in the channel 424 being accessed or a change in a connection 480 to the user device 460.

The user device 460 can include a client device or a device associated with at least one user profile 482. The user device 460 can include, but is not limited to a television device, computing device or a mobile device. The user device 460 can include or correspond to an instance of any client device, mobile device or computer device described herein. In embodiments, the user device 460 can be the same as or substantially similar to computer 800 of FIG. 8A. The user device 460 can be implemented using hardware or a combination of software and hardware. For example, each component of the user device 460 can include logical circuitry (e.g., a central processing unit or CPU) that responses to and processes instructions fetched from a memory unit (e.g., memory, storage device 406). Each component of the user device 460 can include or use a microprocessor or a multi-core processor. A multi-core processor can include two or more processing units (e.g., processor 404) on a single computing component. Each component of the user device 460 can be based on any of these processors, or any other processor capable of operating as described herein. Each processor can utilize instruction level parallelism, thread level parallelism, different levels of cache, etc. For example, the user device 460 can include at least one logic device such as a computing device having at least one processor 404 to communicate, for example, with one or more servers 402 and/or one or more user devices 460. The components and elements of the user device 460 can be separate components or a single component. The user device 460 can include a memory component (e.g., storage device 406) to store and receive content 420, events 422, wager recommendations 442, wager information 430, and wager initiation actionable objects 448. The memory 406 can include a random access memory (RAM) or other dynamic storage device, for storing information, and instructions to be executed by the user device 460. The memory 406 can include at least one read only memory (ROM) or other static storage device for storing static information and instructions for the user device 460. The memory 406 can include a solid state device, magnetic disk or optical disk, to persistently store information and instructions. In some embodiments, the user device 460 can include or deployed as, and/or be executed on any type and form of computing device, such as any desktop computer, laptop computer, or mobile device capable of communication over at least one network and performing the operations described herein. In some implementations, the user device 460 can implement, or perform, any of the functionalities of the non-regulated device 140 or the user device 160 detailed herein in connection with Section A of the present disclosure.

The user device 460 can include a display 466 or display portion. The display 466 can include a display portion of a television, a display portion of a computing device, a graphical user interface (GUI) (e.g., a touchscreen, a display, etc.) and one or more input/output (I/O) devices (e.g., a mouse, a keyboard, digital key pad). The display 466 can include one or more portions, for example, to display multiple events 422, multiple data structures 440 and/or events 422 and data structures 440 concurrently. The display 466 can include a tough screen displaying a data structure 440 as a border region (e.g., side border, top border, bottom border) of the display 466. In some embodiments, the display 466 can include a tough screen display one or more wager recommendations 442 in a menu or listing and in the form of selectable content items on the display 466. The user device 460 can include an input device that couples or communicates with the display 466 of the user device 460 to enable a user to interact with and/or select one or more wager recommendations 442 using a link 446 provided with the wager recommendations 442. The display 466 can enable interaction with one or more visual indications provided through the display 466 of the user device 460 and responsive to an interaction (e.g., select, click-on, touch, hover), the user device 460 can generate an indication identifying a user input and/or selection of at least one wager recommendation 442.

The user device 460 can include a device identifier 464. The device identifier 464 can include a script, code, label, or marker that identifies a particular user device 460. In embodiments, the device identifier 464 can include a string or plurality of numbers, letters, characters or any combination numbers, letters, and characters. In some embodiments, each device can have a unique device identifier 464. The user device 460 can include a client application 474. The client application 474 can include a user application executing on the user device 460 or provided to the user device 460 by the server 402. The application 474 can include a web application, a server application, resource, desktop and/or file. In embodiments, the application 474 can include local applications (e.g., local to a user device 460), hosted application, Software as a Service (SaaS) application, virtual application, mobile application, and other forms of content. In some embodiments, the application 474 can include or correspond to applications provided by remote servers or third party servers. In embodiments, the application 474 can access the wager information 430 stored and maintained at the server 402 and generate a wager initiation actionable object 448 to a user through the user device 460. The wager initiation actionable object 448 can include a user-selectable hyperlink that initiates a process to generate a wager 476 using the wager information 430 and transmit the wager 476 from the user device 460, through the application 474, to the server 402. In embodiments, the wager initiation actionable object 448 can include a user-selectable hyperlink that initiates a process to transmit instructions 478 to the server 402 to place a wager 476 using the wager information 430 corresponding to the selected wager initiation actionable object 448. In some embodiments, the wager initiation actionable object 448 can include a user-selectable hyperlink that initiates a process to download a webpage, additional wager information 430, odds 436 (e.g., updated odds, current odds), and/or registration information to register a user of the user device 460 in a contest and/or place one or more wagers 476.

In embodiments, one or more communication sessions 480 can be established between the server 402, the node 450 and one or more user devices 460. The session 480 can include a channel or connection between the server 402, the node 450 and/or one or more user devices 460. The session 480 can include an application session (e.g., virtual application), an execution session, a desktop session, a hosted desktop session, a terminal services session, a browser session, a remote desktop session, a URL session and/or a remote application session. The session 480 can include encrypted and/or secure sessions. The encrypted session 480 can include an encrypted file, encrypted data or traffic.

The user device 460 can display the event 422 and/or data structure 440 based in part on or more display parameters 416. The display parameters 416 can include, but are not limited to, a position of the data structure 440 within the display 466, a number of pixels allocated to the data structure 440, a size of the display of the data structure 440, a portion of the display 466 assigned to the data structure 440 and/or a prominence of the data structure 440 within the display 466. In embodiments, the user device 460 can generate or determine the display parameters 416. In some embodiments, the user device 460 can receive the display parameters 416 from the node 450 and/or the server 402. The display parameters 416 can be determined based in part on a current channel 424 accessed by the user device, a current event 422 being access by the user device, a data structure 440 provided to the user device 460, user preferences and/or properties (e.g., size) of the display 466 of the user device 460.

The node 450 can include or maintain a content history 452 for content 420 accessed or provided to a user and/or user device 460 associated with the user. The content history 452 can include a plurality of channels 424 accessed or watched by the user through one or more user devices 460. The content history 452 can include a plurality of content 420 and/or events 422 accessed or watched by the user through one or more user devices 460. The content history 452 can include properties and/or characteristics of the content 420 and/or events 422, including but not limited to, types of content 420, frequency different types of content 420 are accessed, types of events 422 (e.g., types of sports, teams involved), and frequency different types of events 422 content 420 are accessed. The content history 452 can include a time stamp or time data indicating when the content 420, channel 424 and/or event 422 where accessed (e.g., stream to user device 460, provided to user device). In some embodiments, the content history 452 can include or correspond to a streaming history or viewing history of content 420 accessed at one or more user devices 460 for a user. The content history 452 can include a history of televisions shows, television content 420 and/or third party content 420 accessed by one or more user devices 460 via the node 450.

Referring now to FIG. 4B, a table showing a representation of a wager history 488 for a user is provided. The table 488 can be used to identify relationships between particular wagers 476, wagers types, and/or wager amounts 438 made by a user. The wager history 488 can correspond to a wager history for a single user or multiple users. For example, the wager history 488 can be stored and maintained in a user profile 482 for a user or a group profile 484 for a group of users. The table 488 includes a first column identifying the particular wager 476 (e.g., wager A, wager B, etc.). The table 488 includes a second column identifying whether the wager 476 was for a parlay bet or a single bet. It should be appreciated that the table 488 can include other types of wagers and/or bets placed by a user (e.g., a winning team, a total points scored in the event, a total points by one team, an over/under bet, a moneyline bet, straight bet, total line bet). The table 488 includes a third column identify a wager type (e.g., wager type 1, wager type 2, etc.) for a wager. In embodiments, the wager type can include, but not limited to, winning team, total points, moneyline bets, spread bets, or over/under bets. The table 488 can include a fourth column identifying whether the wager was a pre-game wager (e.g., before contest begins) or a live in-game wager (e.g., real-time wagers, play-byplay wagers). The table 488 includes a fifth column identifying wager amounts 438 for the corresponding wager. The table 488 includes a sixth column identifying a time 434 that a wager 476 was placed or entered.

The server 402 and/or node 450 can generate wager recommendations 442 for a user or group of users based in part on a wager history 488 maintained for the user profile 482 and/or group prolife 484. The server 402 and/or node 450 can use properties from the wager history 488 to determine betting patterns for a user or a group of users based in part on the wager history 488. In embodiments, the server 402 and/or node 450 can determine that team A is included in multiple wagers 476 placed by the user or group of users. The server 402 and/or node 450 can identify the number of times the user or group of users has placed a particular type of wager and/or properties of the wagers 476 placed by the user or group of users. For example, the server 402 and/or node 450 can determine that a user places a first type of wager with the highest frequency and typically bets on the moneyline as a pregame wager. In embodiments, the server 402 and/or node 450 can generate one or more wager recommendations 442 (e.g., bet recommendations) for the user or similar users for one or more events 422 being accessed at one or more user devices 460, available to be accessed at one or more user devices 460, and/or scheduled to occur in a determined time period indicating a first type of wager based in part on the wager history 123.

In embodiments, the server 402 and/or node 450 can determine that a user device 460 is accessing or streaming a particular event 422 (e.g., football game) and that a group of other users or other user devices have recently placed moneyline type wagers on the event 422 prior to the event 422 starting. The server 402 and/or node 450 can generate a wager recommendation 442 for the user recommending a moneyline bet as a pre-game wager 476 for the event 422. In embodiments, the server 402 and/or node 450 can generate one or more wager recommendations 442 for the user based on similar wagers 476 the user has placed in the past for similar events 422, for example, an additional wager recommendation 442 recommending a parlay wager 476 using the moneyline as a pre-game wager 476. The number of wager recommendations 442 can vary and can be selected based at least in part on the properties of one or more events 422 and the wager history 488.

Figure 5:
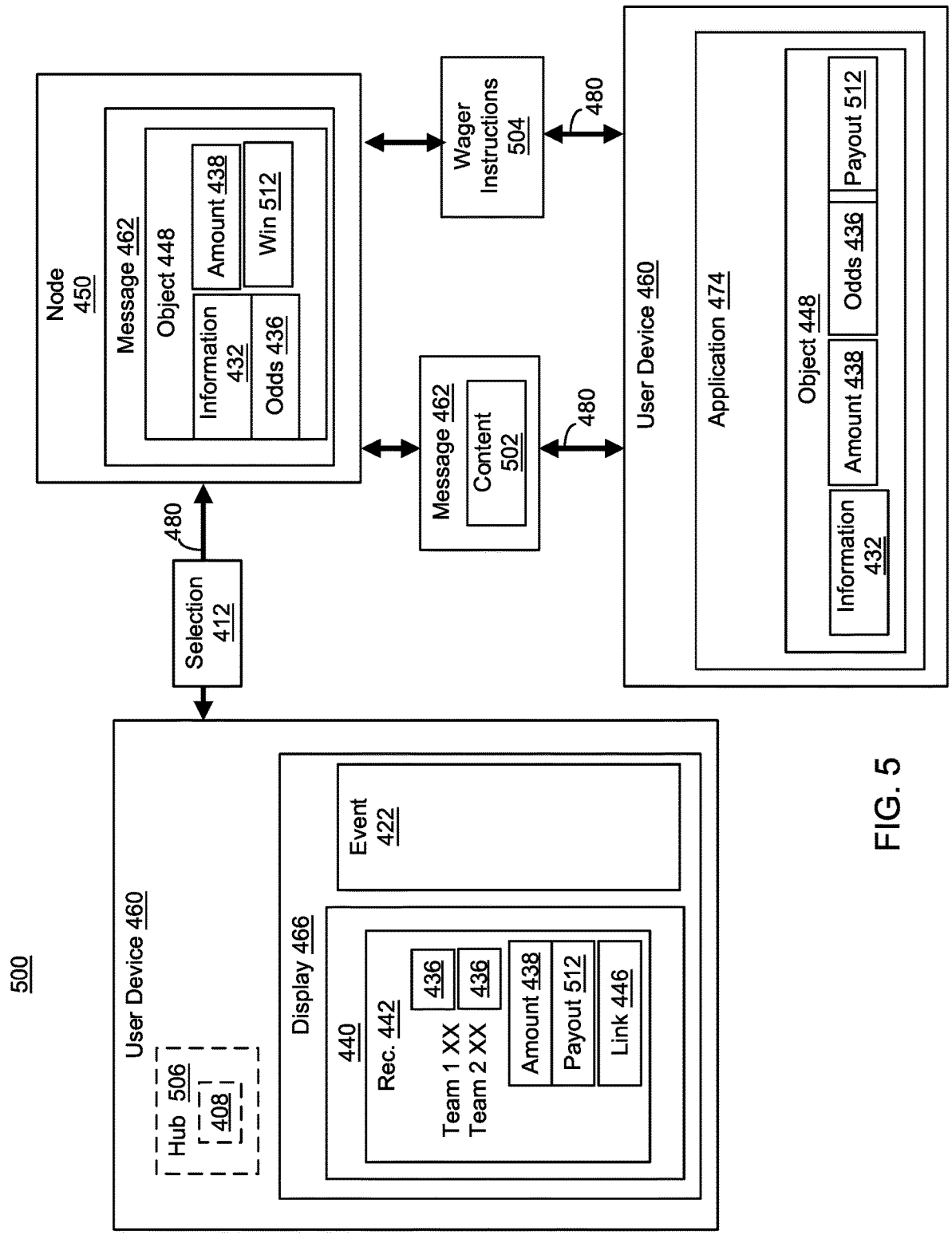
FIG. 5 is a block diagram depicting network node in communication with a client application on a user device.

Referring now to FIG. 5, depicted is an environment 500 having a first user device 460 and a node 450 in communication with a client application 474 executing on a second user device 460 to provide modifiable content 502. The node 450 can transmit the modifiable content 502 to the user device 460 (e.g., second user device 460) in response to an interaction or selection of at least one wager recommendation 442 provided to the user through a first user device 460. In some embodiments, the node 450 can include a network hub 506 (e.g., receiver, dropbox) provided at the first user device 460 to provide content 420 the first device 460 including one or more events 422. The hub 506 can execute the script 408 to provide or stream the content 420 and event 422 to the first user device 460. In embodiments, the hub 506 can execute the script 408 to generate and display the data structure 440 including one or more wager recommendations 442, wager information 430 (e.g., teams, score, time value 434) associated with the wager recommendations 442, odds 436 for wager recommendations 442, a wager amount 438, a payout amount 512 and a link 446 to select the corresponding wager recommendation 442.

The node 450, in response to the selection 412 of a wager recommendation 442 using the link 446, can transmit a message 462 including the modifiable content 502 and at least one wager initiation actionable object 448 corresponding to the selected wager recommendation 442. In embodiments, the modifiable content 502 can include but is not limited to wager information 430, odds 436, wager amount 438 and/or payout amount 512. The user device 460 that the message 462 and modifiable content 502 is transmitted to can include a different user device 460 from the user device 460 that the wager recommendation 442 selection was made. In some embodiments, the node 450 can transmit the message 462 and the modifiable content 502 to the same user device 460 that the wager recommendation 442 selection was made.

The modifiable content 502 can be provided through a client application 474 executing on the user device 460 or provided to the user device 460 from a server (e.g., server 402) or third party application. In embodiments, the client application 474 can launch responsive to the message 462 being received at the user device 460 and the client application 474 can populate one or more fields to include the modifiable content 502 and display the modifiable content 502 to the user of the user device 460. In some embodiments, the client application 474 can launch responsive to an interaction with the message 462 (e.g., user interaction, access or open message) at the user device 460 and the client application 474 can populate one or more fields to include the modifiable content 502 and display the modifiable content 502 to the user of the user device 460.

The client application 474 can display one or more wager initiation actionable objects 448 to the user indicating a wager opportunity for an event 422. The wager initiation actionable object 448 can include wager information 430 such as the teams participating in the event 422, a current score of the event 422, odds 436 associated with the wager initiation actionable object 448 (e.g., odds for a winning team, odds for a total combined points for the event 422, odds for a moneyline bet), a wager amount 438 and a payout amount 512 that is generated based in part on the odds 436 and the wager amount 438. The wager amount 438 can include a pre-generated amount provided to the client application 474 based in part on the selected wager recommendation 442 and/or one or more previous wager amounts 438 included in a user profile 482 of the user of the user device 460. The wager amount 438 can include modifiable content 502, for example, which can be changed or modified (e.g., increased, decreased, etc.) by the user to change the wager amount 438 the user would like to enter for a proposed wager 476.

In embodiments, the odds 436 can be continually and dynamically updated during the event 422 such that the odds 436 as presented at the user device 460 can change from a first time period to a second time period. For example, the odds 436 can change from an originally value as presented to the user through the client application 474 to a second time period when the user makes a selection of the corresponding wager initiation actionable object 448. In some embodiments, the node 450 can update the odds 436 after the selection of the wager recommendation 442 at the first user device 460 to provide current or up-to-date odds 436 to the user when the wager initiation actionable object 448 is provided to the user at the second user device 460. The odds 436 can be modified based in part to changes in the event 422 the wager initiation actionable object 448 is associated with. For example, the odds 436 can be dynamically modified in response to changes in a probability of an outcome (e.g., winning team, total score, moneyline bet) occurring in the event 422, score changes during the event, a change in the time value 434 of the event 422 (e.g., time remaining changes) and/or one or more occurrences (e.g., player injured, non-scoring plays) during event 422. The node 450 can monitor the event 422 and the odds 436 presented at the user device 460 can dynamically update the odds 436 to provide up-to-date odds 436 for the respective wager initiation actionable object 448. In some embodiments, the node 450 can access or receive the dynamic odds 436 from the server 402 or third party and provide the modified odds 436 to the user device 460 through the client application 474. The odds 436 can include or correspond to time varying values that are modified or changed to reflect or correspond to a time value 434 (e.g., current time remaining) in the event 422.

In some embodiments, the node 450 and/or server 402 can generate wager recommendations 442 for live or real-time betting. For example, the wager recommendations 442 can include or correspond to play-by-play betting. The node 50 and/or server 402 can generate one or more wager recommendations 442 for a user device 460 based in part on a current event 422 being accessed or provided to the user device 460, a content history 452 for the user and/or a wager history 488 for the user. The node 50 and/or server 402 can generate one or more wager recommendations 442 for display through a user device 460 for a particular play or series of plays (e.g., possession) within a current or live event 422. The node 450 and/or server 402 can generate and update the wager recommendations 442 once a sports event 422 begins (e.g., is underway, initiates) and can continue providing and/or updating the wager recommendations 442 during the respective sports event 422, for example, through the user device 460. The node 450 and/or server 402 can generate wager recommendations 442 for a particular scoring opportunity (e.g., goal, home run, touchdown, etc.) within a current or live event 422.

The node 450 and/or server 402 can generate one or more wager recommendations 442 responsive to different occurrences that may occur during a sports event 422. For example, the node 450 and/or server 402 can generate a first set of wager recommendations 442 before or as a sports event 422 begins. In embodiments, the first set of wager recommendations 442 can correspond to a first team to score a goal, a first player to hit a home run, or a first player to score a touchdown. After a first scoring occurrence or event (e.g., goal, home run, touchdown, etc.) occurs within the sports event 422, the node 450 and/or server 402 can generate a second set of wager recommendations 442. The second set of wager recommendations 442 can be different from the first set of wager recommendations 442. In some embodiments, one or more wager recommendations 442 from the first set of wager recommendations 442 can be the same as one or more wager recommendations 442 from the second set of wager recommendations 442. After a second scoring occurrence or event (e.g., field goal, strike out, three point shot) occurs within the sports event 422, the node 450 and/or server 402 can generate a third set of wager recommendations 442. The third set of wager recommendations 442 can be different from the first set of wager recommendations 442 and/or the second set of wager recommendations 442. In some embodiments, one or more wager recommendations 442 from the third set of wager recommendations 442 can be the same as one or more wager recommendations 442 from the first set of wager recommendations 442 and/or the second set of wager recommendations 442. The node 450 and/or server 402 can continually and dynamically generate one or more wager recommendations 442 during a live sports event 422 or sports event 422 that is underway to provide live betting or play-by-playing.

The node 450 and/or server 402 can continually and dynamically generate one or more wager recommendations 442 that are personalized for a user associated with a user profile 482 by using user attributes and/or other data stored in and/or associated with the user profile 482, including but not limited to, a content history 452 and/or a wager history 488. The node 450 and/or server 402 can rank and assign weights to each of the wager recommendations 442 provided to a user or previously selected by the user using a match score. In embodiments, the match score can indicate a likelihood that a user associated with the user profile 482 is likely to act upon, select, or engage with a wager recommendation 442 or a group of users (e.g., fans at a sports event, fans of the same team) associated with a group profile 484 are likely to act upon, select, or engage with a wager recommendation 442. In embodiments, the node 450 and/or server 402 server 402 can identify and select a predetermined number of wager recommendations 442 (e.g., top three, top five, top ten) having the highest or greatest match score as compared to the other wager recommendations 442. The node 450 and/or server 402 can provide, for example, through a display 466 of a user device 460, the predetermined number of wager recommendations 442 having the highest or greatest match score to provide a personalized set of real-time wager recommendations 442 to the respective user or group of users.

In embodiments, the node 450 and/or server 402 can determine a position or location of a data structure 440 and one or more wager recommendations 442 within a display 466 of a user device 460 based in part on the match score of the one or more wager recommendations 442. For example, wager recommendations 442 having a greater match score can be positioned having a greater prominence within a data structure 440 and/or within a display 466 as compared to other wager recommendations 442 having a lower prominence. The node 450 and/or server 402 can determine a positon of a first wager recommendation 442 having a first match score. The first match score can correspond to the highest or greatest match score as compared to match scores of other wager recommendations 442. The node 450 and/or server 402 can select or assign a first position to the first wager recommendations 442 within the data structure 140 and/or display 466 having a greatest prominence. For example, the prominent position with the data structure 140 and/or display 466 can include, but not limited to, a top portion and/or a start of a list of the candidate recommendations. The prominence of a wager recommendation 442 can be modified using features of the display, such as a stylistic feature (e.g. a particular text style (which can specify a size, a font, underlining, bold, italics, or another style, and in some embodiments the style is different than the another style used for a different candidate recommendation), a visual indicator (e.g. a box, circle, or other visual indicator that surrounds or is otherwise positioned relative to the content item), or any other appropriate feature.

The node 450 and/or server 402 can positon and/or display other wager recommendations 442 having less prominence or in a less prominent position within the data structure 440 and/or display 466 as compared to the wager recommendations 442 having a higher or greater match score. Thus, the wager recommendations 442 having the highest or greatest match score can be positioned and/or displayed with a greater prominence to increase a likelihood that a user is likely to act upon the wager recommendations 442 compared to the other wager recommendations 442 of the plurality of wager recommendations 442. In some embodiments, the wager recommendations 442 can be generated based on an ongoing basis or based in part on an upcoming sporting event 422, for example, scheduled on a television guide or available to the user through the user device and node 450 at a later time.

Figure 6:
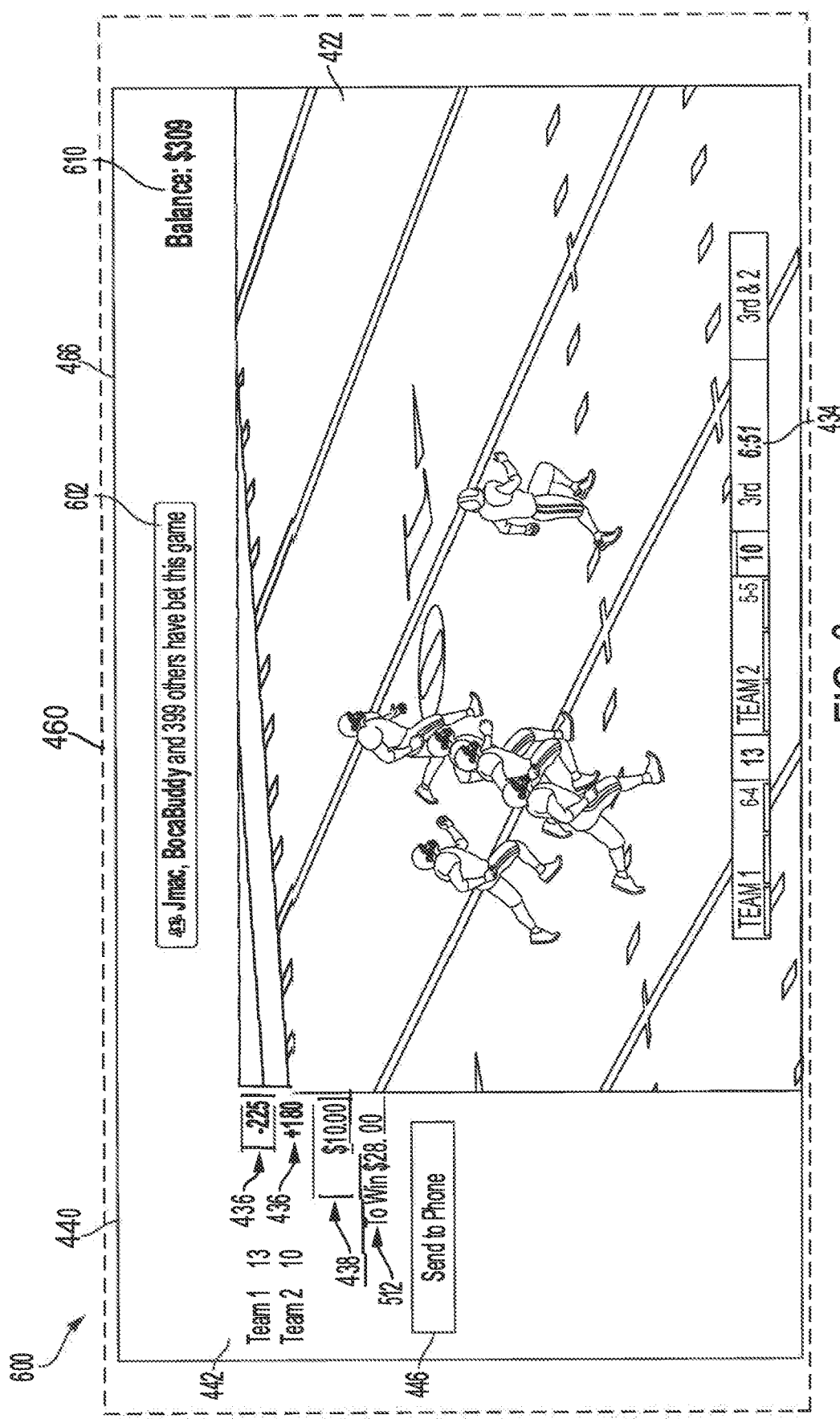
FIG. 6 is a diagram depicting a display of a user device showing a data structure and an event concurrently displayed.

Referring now to FIG. 6, depicted is a display 466 of a user device 460 showing a data structure 440 and an event 422 concurrently. The event 422 and the data structure 440 can be provided through the display 466 such that both the event 422 and the data structure 440 are visible to a user of the user device 460. In embodiments, the data structure 440 can be generated or provided as an overlay region or border region of the display 466. The user device 460 can assign or position the data structure 440 within the display 466 based in part on display parameters 416 received from the node 450 and/or the server 402.

In embodiments, the data structure 440 can be generated or presented through the display 466 of the user device 460 in a variety of different formats or locations based in part on a display of the event 422 and/or properties of the display 466. In some embodiments, the data structure 440 can be generated as a side border region (e.g., panel region), top border region, bottom border region, a combination of two or more of a side border region, top border region, and bottom border region. In embodiments, the data structure 440 can be generated as an overlay region over a portion of the event 422 such that both a portion of the event 422 and the data structure 440 are visible to a user of the user device 460. In some embodiments, the data structure 440 can be generated as or include a sports ticker, a digital on-screen graphic, a score box, or a score bar.

The data structure 440 can include a wager recommendation 442 presented within the border region of the display 466 and adjacent to the active event 422. The wager recommendation 442 can include a current score of the event 422 and identify the teams participating in the event 422. The wager recommendation 442 can include a wager amount 438 and a payout amount 512. The wager recommendation 442 can include odds 436 corresponding to time varying values. For example, the node 450 or script 408 can update the odds 436 based in part on a time value 434 of the event 422 and/or a score of the event 422.

The odds 436 can correspond to a probability of an outcome (e.g., winning team, total score, moneyline bet) occurring in the event 422 and the odds 436 or probability of the outcome occurring can changes during the course of the event 422 as the score changes, an amount of time remaining changes and/or one or more occurrences (e.g., player injured, non-scoring plays) happen during the event 422. The node 450 and/or script 408 executing at the user device 460 can dynamically update or modify the odds 436 for the wager recommendations in response to score changes, an amount of time remaining changes and/or one or more occurrences (e.g., player injured, non-scoring plays) happen during the event 422. The odds 436 can include time varying values that are modified or changed to reflect or correspond to a time value 434 (e.g., current time remaining) in the event 422.

The data structure 440 can include an account balance 610 for a user account or user profile 482 for the user of the user device 460. The node 450 and/or script 408 can update or maintain the account balance 610 for the user during the event 422 to reflect any changes in the account balance, for example, in response to a recently placed wager 476, transfer of funds to the user account and/or withdrawal from the user account. In embodiments, the account balance 308 can include time vary values that the node 450 and/or script 408 dynamically update to reflect changes to the user account for the user of the user device 460.

The data structure 440 can include a message board 602. The message board 602 can include a message or note to the user indicating one or more other users that may have interacted with the same event 422 being displayed on the user device 460, placed wagers 476 on the same event 422 being displayed on the user device 460 and/or selected one or more of the wager recommendations 442 provided to the user through the data structure 440. In embodiments, the users can include users from the group profile 484 that the user profile for the user of the user device 460 is included with or linked with. In some embodiments, the users can include users having similar characteristics to the user of the user device 460, including but not limited to, similar geographic area, same favorite teams, same favorite players, and/r watching the same event 422. In some embodiments, the users can include random users that are watching and placing wagers 476 on the same event 422 the user of the user device 460 is watching.

The data structure 440 can include a link 446. In embodiments, the data structure 440 can include at least one link 446 for each wager recommendation 442 provided to enable a user to select the respective wager recommendations 442 and current odds 436 for placing a wager 476 using the wager recommendations 442 and current odds 436. In embodiments, the link 446 can include a set of instructions, code or script that when accessed (e.g., interacted with, selected, touched), via the first device 460, causes the node 450 to transmit a message 462 to the second device 460 using the second device identifier 464 and present a wager initiation actionable object 448 corresponding to the selected wager recommendation 442. For example, responsive to a selection of a link 446, the node 450 can determine the corresponding wager recommendation 442 and odds 436 presented to the user when the user selected the link 446 and transmit a message 462 to the second device 460 of the user including a wager initiation actionable object 448 that includes the wager recommendations 442 and odds 436. In embodiments, the node 450 and/or script 408 can generate the link 446 to identify or indicate the second user device the message 462 will be transmitted to, for example, a user mobile device, handheld device or computing device. In some embodiments, the node 450 and/or script 408 can generate the link 446 to identify or indicate multiple user devices associated with the user and enable the user to select or indicate which user device to transmit the message 462 and wager initiation actionable object 448.

Figure 7A:
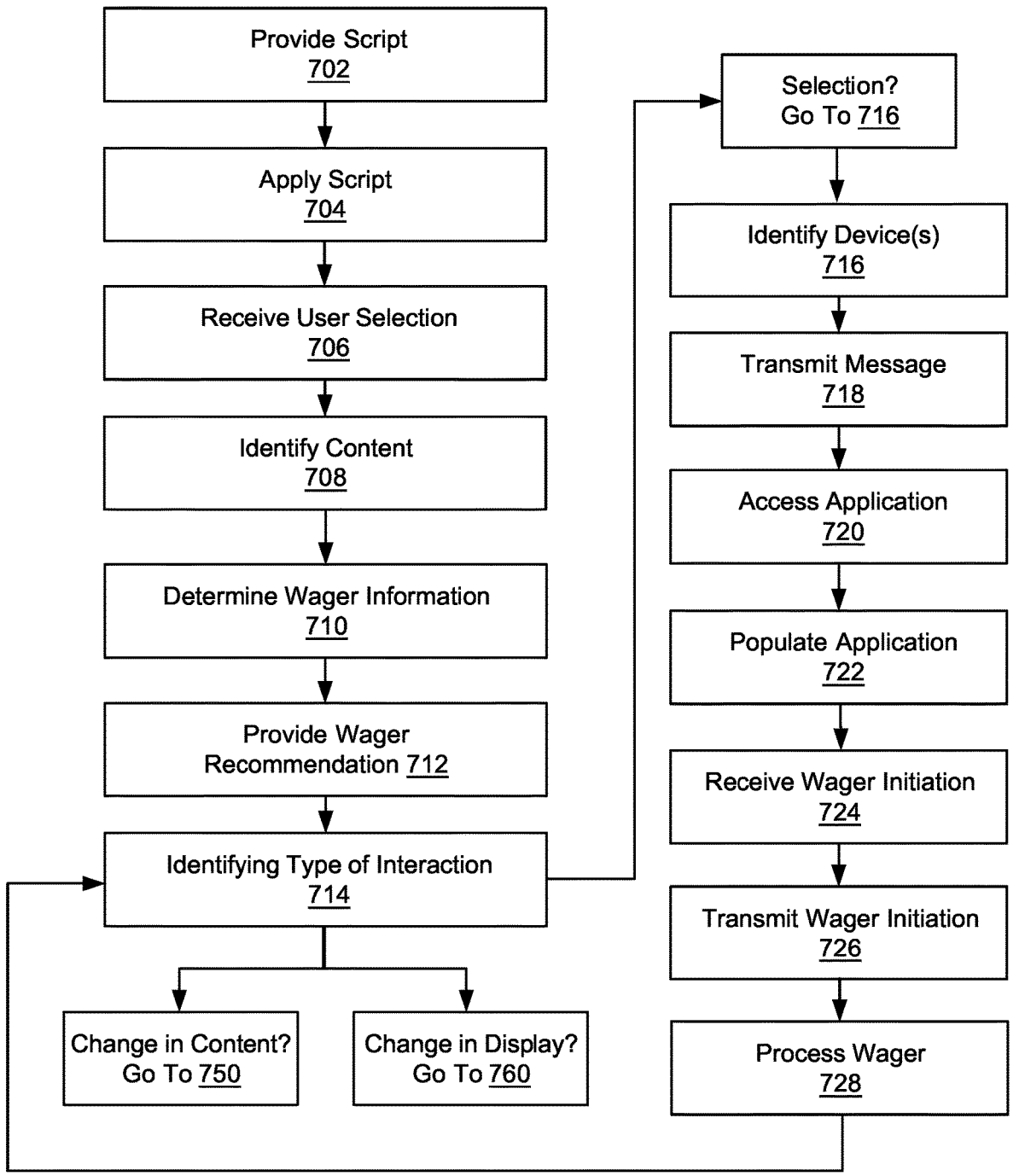
FIGS. 7A and 7B are flow diagrams depicting one or more embodiments of a method for providing wager recommendations based on streaming data.
Figure 7B:
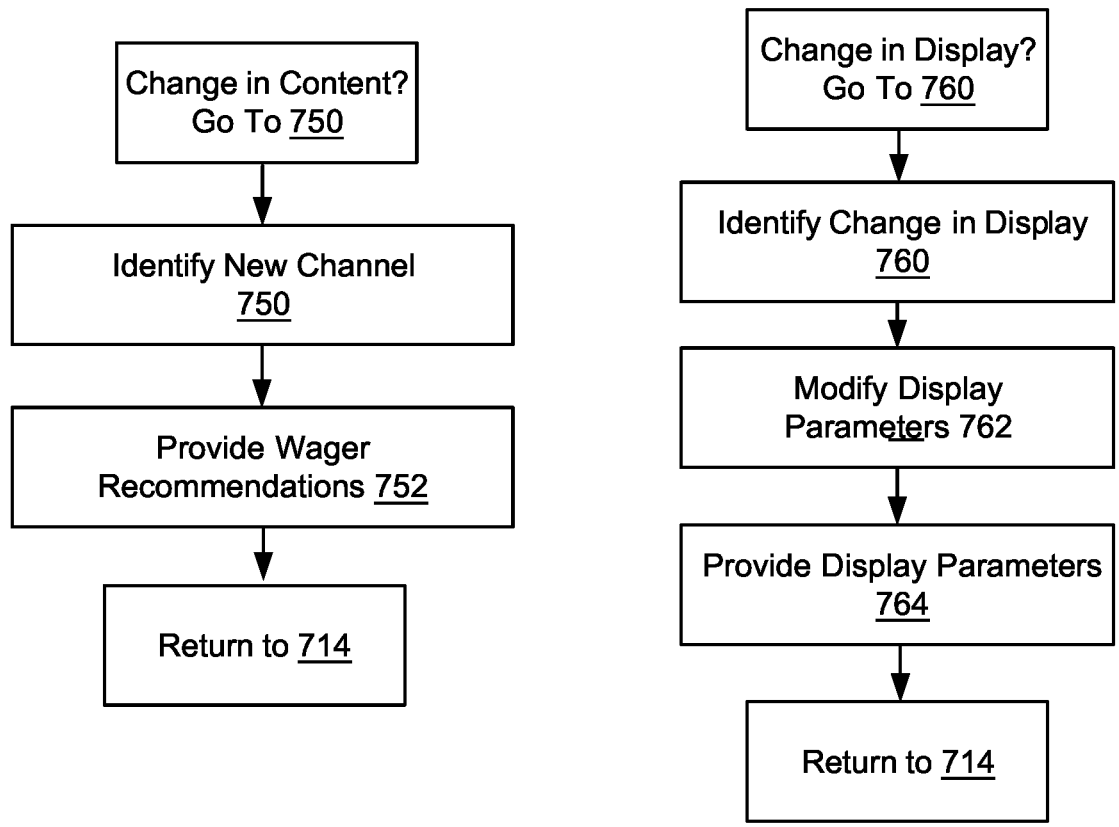

Referring now to FIGS. 7A-7B, depicted is a flow diagram of one embodiment of a method 700 for providing wager recommendations based on streaming data. In brief overview, the method 700 can include one or more of: providing a script (702), applying the script (704), receiving a user selection (706), identifying content (708), determining wager information (710), providing wager recommendations (712), identifying an interaction (714), identifying a device (716), transmitting a message (718), accessing an application (720), populating an application (722), receiving a wager initiation (724), transmitting the wager initiation (726), processing a wager (728), identify a new channel (750), providing wager recommendations (752), identifying a change in a display (760), modifying display parameters (762), and providing display parameters (764). The functionalities of the method 300 may be implemented using, or performed by, the components detailed herein in connection with FIGS. 1A, 2, 4A, 5, 8A, and 8B.

Referring now to operation (702), and in some embodiments, a script 408 can be provided. A server 402 can generate and provide a script 408 to a node 450 and the script 408 can include instructions for generating wager recommendations 442 based in part on an event 422 being accessed or watched by a user. The script 408 can include a command, code, automation tool, program or set of instructions for determining wager information 430 and/or generating wager recommendations 442. The script 408 can reference or point to a database (e.g., storage device 406 of server 402) for retrieving or accessing data and information associated with wager recommendations 442 for one or more events 422. The script 408 can include instructions for determining wager parameters 432, odds 436 and/or wager amounts 438 for one or more events 422. In some embodiments, the script 408 can include a link or command to access or request wager information 430 and/or generating wager recommendations 442 from the server 402.

Referring now to operation (704), and in some embodiments, the script 408 can be applied. The node 450 can apply the script 408 to content 420 accessed by one or more devices 460. The devices 460 can include client device, user device, television, mobile device, handheld computing device, and/or an application 474 executing on at least one of a client device, user device, television, mobile device, or handheld computing device. The node 450 can provide or stream content 420 to a user device 460, for example, but not limited to, television content provided through a plurality of different channels 424. The content 420 can include television content, third party application content, streaming services and/or internet content. In some embodiments, the node 450 can include or correspond to a TV provider hub (e.g., dropbox, receiver, modem, etc.) that the user device 460 connects with to access the plurality of channels 424. The node 450 can apply the script 108 to content 420 to monitor the content 420 and identify one or more events 422 being provided or displayed to a user through the respective user device 460. In embodiments, the script 408 can execute at the node 450 and monitor or track the content 420 and events 422 being accessed by a user device 460. The script 408 can execute and monitor a connection 480 to a user device 460 to track the content 420 and events 422 being accessed by the user device 460. In embodiments, the script 408 can execute at the user device 460 and monitor or track the content 420 and events 422 being accessed by the user device 460. In embodiments, the script 408 can detect and monitor content 420 streamed, accessed or provided to the user device 460, for example, to generate and/or maintain a content history 452 (e.g., streaming history) for the user and/or user device 460

In embodiments, the node 450 can modify the script 408 based in part on properties of a user profile 482 (e.g., subscription information, channel access) associated with a user of the user device 460, connection properties for a connection 480 between the node 450 and the user device 460 and/or policies of the node 450. The node 450 can modify the script 408 to update or change one or more lines of code or instructions of the script 408, for example, to adapt or configure the script 408 for execution on the node 450, a connection 480 and/or a user device 460. In some embodiments, the node 450 can modify the script 408 based in part on a type of service or subscription the user and/or user device 460 has with the node 450 or streaming service provided by the node 450.

Referring now to operation (706), and in some embodiments, a user selection 412 can be received or identified. The node 450 can receive, detect or identify a user selection 412 of a channel 424 at the user device 460. The channel 424 can include or correspond to an event 422, including but not limited to a sporting event (e.g., football game, baseball game, basketball game). The node 50 can determine or receive an indication of the channel 424 the user is currently watching through the user device 460. In some embodiments, the script 408 can detect the channel 424 the user is currently watching through the user device 460 and provide an indication identifying the respective channel 424.

Referring now to operation (708), and in some embodiments, content 420 can be identified. The node 450 can determine the content 420 being accessed by the user device 460. In embodiments, the node 450 can use the channel 424 to determine the content 420 being currently accessed or provided to the user device 460. The node 450 can access or maintain a television guide or television schedule indicating what events 422, shows or other forms of content 420 are being provided on what channels 424. In some embodiments, the node 450 can access a television guide or television schedule from a third party server or database indicating what events 422, shows or other forms of content 420 are being provided on what channels 424. The node 450 can determine an event 422 currently being provided to the user device 460 and displayed on the user device 460.

Referring now to operation (710), and in some embodiments, wager information 430 can be determined. The node 450 can determine wager information 430 based in part on the event 422 being access or provided to the user through the user device 460. The wager information 430 can include one or more wager parameters 432 and/or one or more event parameters 426. In embodiments, the node 450 can use the event parameters 426 to determine or generate wager parameters 432 for the event 422. In some embodiments, the node 450 can access or receive the wager parameters 432 from a third party source or third party server (e.g., contest server, server 402, betting server, etc.). The wager parameters 432 can include but are not limited to, a type of wager, a wager amount, a time associated with a wager 476 (e.g., duration wager is open or available), one or more teams included in a wager 476, a contest name, an outcome, a type of sport, a type of contest, odds 436 associated with the event 422 and/or with the wager 476. The event parameters 426 can include, but are not limited to, a type of sport, time value 434 for the event 422 (e.g., start time, duration, time remaining, end time), teams involved in the event 422, players involved in the event 422, one or more possible outcomes, and/or a contest name.

Referring now to operation (712), and in some embodiments, a wager recommendation 442 can be provided. The node 450 can generate and provide one or more wager recommendations 442 to the user device 460. The node 450 can generate the one or more wager recommendations 442 for the event 422 responsive to the wager information 430, the one or more wager parameters 432, the time value 434 of the event 422 and/or the channel 424 providing the event 422. The wager recommendation 442 can include a possible outcome or occurrence during the event 422 and odds 436 (e.g., probability) of the outcome or occurrence happing during the event 422. In embodiments, the wager recommendation 442 can include a recommendation to a user for a wager 476 for the event 422 and the wager 476 can include or correspond to a possible outcome (e.g., total score, winning team, total points by one team, over/under bet, moneyline bet) for the event 422 or an occurrence (e.g., next team to score, half-time score) during the event 422. The wager recommendation 442 can include odds 436 indicating a probability of the outcome or occurrence happening during the event 422. The wager recommendation 442 and/or the odds 436 for the wager recommendation 442 can be based in part on a current score of the event 422 and/or a time value 434 (e.g., time remaining) of the event 422.

In embodiments, the node 450 can execute the script 408 to generate the wager recommendation 442. The node 450, using the script 408, can request or access one or more wager recommendations 442 for the event 422 from the server 402 and/or a third party database. The wager recommendations 442 can include dynamic or active wager recommendations 442 that are generated and dynamically updated as the event 422 progresses, a score of the event 422 changes and/or a time value 434 of the event 422 changes. In some embodiments, the node 450, using the script 408, can request or access wager information 430 from the server 402 and/or a third party database and generate the wager recommendations 442 for the event 422 using the received wager information 430. In some embodiments, the node 450 can use a content history 452 and/or wager history 488 maintained for a user to generate wager recommendations 442 for the user based in part on a frequency the user accesses certain types of events 422 and a frequency a user places certain types of wagers 476 on the events 422.

The node 450 can provide the wager recommendation 442 in the form of a data structure 440. The data structure 440 can include one or more wager recommendations 442 and data having time varying values associated with the one or more wager recommendations 442 and the one or more wager parameters 432. In embodiments, a current value of the time varying values can correspond to the time value 434 of the event 422 (e.g., current time of event, time remaining in the event). The node 450 can provide the data structure 440 for display concurrent with the event 422 through the first device 460. The data structure 440 can include a link 446, that when accessed via the first device 460, causes the node 450 to transmit a message 462 to the second device 460 using the second device identifier 464 and present a wager initiation actionable object 448 configured to cause the second device 460 to transmit instructions 478 to place a wager 476 using at least one selected wager recommendation 442 and the respective one or more wager parameters 432.

The node 450 can provide display parameters 416 for displaying the data structure 440 at the user device 460. The display parameters 416 can include, but are not limited to, a position of the data structure 440 within the display 466, a number of pixels allocated to the data structure 440, a size of the display of the data structure 440, a portion of the display 466 assigned to the data structure 440 and/or a prominence of the data structure 440 within the display 466. In embodiments, the node 450 can generate the display parameters 416 based in part on a current display or display parameters of the event 422 through the display 466 of the user device 460. The node 450 can generate the display parameters 416 to determine a size of the data structure 440 through the display 466, a number of pixels of the display 466 allocated to the data structure 440, a positon or location for the data structure 440 within the display 466, or to assign a portion of the display 466 to the data structure 440. The node 450 can generate the display parameters 416 for the data structure 440 such that the data structure 440 is displayed concurrently with the event 422 and positioned based in part on a current view of the event 422.

The display parameters 416 can be provided to the user device 460 in the form of code, a set of instructions or a command causing the user device 460 and/or script 408 to display of the data structure 440 relative to the display of the event 422 within the display 466 of the user device 460. The user device 460 can use the display parameters 416 to determine a positon of the data structure 440 within the display 466. The user device 460 can allocate a number of pixels to the data structure 440 within the display 466. In embodiments, the user device 460 can display the data structure 440 as an overlay region provided over a portion (e.g., border area, panel area, etc.) of the display of the event 422. The user device 460 can use the display parameters 416 to determine a type of border region the data structure 440 is provided as within the display 466. For example, the data structure 440 can be provided as a border region within the display 466 such that the event 422 and data structure 440 are displayed and visible to a user of the user device 460 at the same time or concurrently. The user device 460 can use the display parameters 416 to generate the data structure 440 as a side border region (e.g., side panel), a bottom border region or top border region of the display 466. In some embodiments, the user device 460 can use the display parameters 416 to generate the data structure 440 as at least one of a sports ticker, digital on-screen graphic, score box, or score bar within the display 466 of the user device 460. In embodiments, the display parameters 416 can be provided to display of the data structure 440 such that the data structure 440 stays visible concurrently with the event 422 within the display 466 as the display of the event 422 changes during the duration of the event 422.

Referring now to operation (714), and in some embodiments, an interaction 414 can be identified. The interaction 414 can include a user interaction, a user selection 412 and/or a change to the event 422 provided to the first device 460. The user interaction can include, but is not limited to, a change in the content 420, a change in the channel 424 being accessed or a change in a connection 480 to the user device 460. The user selection 412 can include, but is not limited to, a selection of at least one wager recommendation 442. A change to the event 422 can include, but is not limited to, a change in a display of the event 422 at the user device 460. The node 450 can determine the type of interaction 414. If the node 450 determines the interaction 414 was a selection 412 of a wager recommendation, the method 700 can move to (316). If the node 450 determines the interaction 414 was a change to the content 420, the method 700 can move to (750). If the node 450 determines the interaction 414 was a change to a display of the event 422, the method 700 can move to (760).

Referring now to operation (716), and in some embodiments, a device 460 can be identified. The node 450 can identify a second user device 460 associated with the user or associated with a user profile 482 for the user. In some embodiments, the identified device 460 can be the same device 460 the user is accessing or watching the event 422 (e.g., mobile device, handled computing device). In embodiments, the identified device 460 can be a second different device 460 from the device 460 the user is accessing or watching the event 422. For example, the user can access or watch the event 422 through a first television device 460 and the second device 460 can include a mobile device 460 or handheld computing device 460 for the user.

In embodiments, the node 450 can use the device identifier 464 included with the wager information 430 to identify one or more user devices 460 associated with the user. The node 450 can provide the device identifier 464 to the server 402 and request data associated with one or more user devices 460 associated with the user. The server 402 can use the device identifier 464 to parse or search a plurality of user profiles 482 to identify the user and/or the user profile 482 associated with the user. The server 402 can access the identified user profile 482 to identify the correct or appropriate device 460 and provide the user device 460 (e.g., second user device) information to the node 450.

In some embodiments, the node 450 can receive the device identifier 464 responsive to the selection or interaction with the link 446 provided with the data structure 440 and wager recommendation 442. In embodiments, the link 446 can include a set of instructions, code or script that when accessed (e.g., interacted with, selected, touched), via the first device 460, causes the first device 460 to transmit a device identifier 464 to the node 50 indicating which user device or multiple user devices 460 for the node 450 to transmit the message 462 and wager initiation actionable object 448. The link 446 as displayed or presented via the user device 460 can indicate or identify a user device 460 for the node 450 to transmit the message 462 and wager initiation actionable object 448. In some embodiments, when selecting the link 446, the user can enter or indicate a user device 460 for the node 450 to transmit the message 462 and wager initiation actionable object 448. The user can enter or provide a device identifier 464 for the respective user device 460. In embodiments, the node 450 can determine the device identifier 464 based in part on the video data at the first device 460 when the link 446 is selected. In embodiments, the node 450 and/or script 408 can generate the link 446 to identify or indicate the second user device 460 the message 462 will be transmitted to, for example, a user mobile device, handheld device or computing device. In some embodiments, the node 450 and/or script 408 can generate the link 446 to identify or indicate multiple user devices 460 associated with the user and enable the user to select or indicate which user device 460 to transmit the message 462 and wager initiation actionable object 448.

Referring now to operation (718), and in some embodiments, a message 462 can be transmitted. The node 450 can transmit the message 462 to the second device 460 using the second device identifier 464 and present a wager initiation actionable object 448 configured to cause the second device 460 to transmit instructions 478 to place a wager 476 using at least one selected wager recommendation 442 and the respective one or more wager parameters 432. In embodiments, the node 450 can transmit the message 462 responsive to a selection of a link 446 provided with the data structure 440 and associated with at least one wager recommendation 442. For example, the node 450 can, responsive to an interaction with the link 446, identify the second device 460 and transmit the message 462 to the second device that includes a wager initiation actionable object 448 corresponding to or including the wager recommendation 442 associated with the selected link 446.

The node 450 can transmit the message 462 to the user device 460 through a communication sessions 480 established between the node 450 and the user device 460. The node 450 can generate the message 462 to include the wager initiation actionable object 448. The node 450 can generate the message 462 to include one or more data packets and the data packets can include the wager initiation actionable object 448 in a payload portion of the one or more data packets. In some embodiments, the message 462 can indicate or identify the user device 460 the wager recommendation 442 selection was made and/or a time value 434 indicating when the selection was made. The message 462 can include the wager information 430, one or more wager parameters 432, odds 436 and/or event parameters 426 associated with the event 422. In some embodiments, the message 462 can include code or instructions causing the user device 460 to generate the wager initiation actionable object 448 in an application 474 when the application 474 launches.

Referring now to operation (720), and in some embodiments, an application 474 can be accessed. In embodiments, the user device 460 can launch an application 474 (e.g., user application, client application) responsive to receiving the message 462, for example, to interact with the wager initiation actionable object 448. The message 462 can include or cause a prompt, window or menu to open when received at the user device 460. The application 474 can launch responsive to a user interaction (e.g., click-on, touch, select) with the prompt, window or menu. In some embodiments, responsive to the user interaction, the user device 460 can receive, download or access the application 474 from the server 402.

In some embodiments, the user device 460 can launch the application 474 executable on the user device 460 that is configured to establish a communication session 480 with the server 402 and access the wager information 430 stored at the server 402 (e.g., storage device 406) via the communication session 480 and present the wager initiation actionable object 448 configured to cause the second device 460 to transmit instructions 478 to the server 402 to place a wager 476 corresponding to the selected wager initiation actionable object 448. In embodiments, the node 450 can perform a handshake with the user device 460 to transmit the message 462 to the user device 460 from the node 450.

Referring now to operation (722), and in some embodiments, the application 474 can be populated. The user device 460 can launch the application 474 and populate one or more fields of the application 474 to include one or more wager initiation actionable objects 448 and display the objects 448 to a user through the application 474. The application 474 can be populated to include or present the wager information 430 associated with the wager initiation actionable objects 448, including but not limited to, an event name, teams involved in the event 422, one or more wager parameters 432, a current score of the event 422, a type of wager, odds 436, time value 434 for the event 422, a wager amount, and/or a payout amount.

In some embodiments, the application 474 can launch on the user device 460 and can include a script or code to receive or download the wager initiation actionable objects 448 and associated wager information 430 from the server 402 or node 450 and populate (e.g., auto-populate) one or more fields of the application 474 to display the wager initiation actionable objects 448 and associated wager information 430. The application 474 can present or display one or more wager initiation actionable objects 448 to the user of the user device 460. The wager initiation actionable objects 448 can correspond to or represent opportunities for the user generated based on the wager information 430 accessed from the server 402. The wager initiation actionable objects 448 can correspond to or be associated with one or more outcomes of the event 422 (e.g., event 422 currently being accessed and watched at the user device 460, active event 422 available for viewing at the user device 460) and include odds 436 associated with the respective outcome occurring. In some embodiments, the wager initiation actionable objects 448 can include or correspond to wagers or betting opportunities for the event 422. The wager initiation actionable objects 448 can include selectable content, for example, that in response an interaction with the respective wager initiation actionable object 448, causes the second device 460 to transmit instructions 478 to the server 402 to place a wager 476 using the wager information 430 or a portion of the wager information 430 represented by the wager initiation actionable object 448.

In embodiments, the user device 460 can update or modify odds 436 associated with an event 422 based in part on a time value 434 of the event 422 (e.g., time remaining in the event) when the wager initiation actionable object 448 is provided to the user device 460. In some embodiments, the user device 460 can receive updated odds 436 from the server 402 or node 450 when the wager initiation actionable object 448 is received at the user device 460. The odds 436 can be updated to reflect a current time value 434 of the event 422 as compared the time value 434 of the event 422 when the wager recommendation 442 is selected at the first user device 460. The odds 436 can be updated to reflect a current probability of an outcome associated with the wager initiation actionable object 448 occurring based in part on the time value 434 of the event 422 and one or more conditions (e.g., current score, player statistics, team statistics) of the event 422. For example, the user device 460 can modify the odds 436 for a wager initiation actionable object 448 using difference in time between when the wager initiation actionable object 448 is received at the second user device 460, a time when the wager recommendation 442 is selected at the first user device 460 and a time value of 434 of the event 422.

In embodiments, the user device 460 can determine if the odds 436 have changed, for example, from a time when the wager recommendation 442 is selected at the first user device 460 to the time when the wager initiation actionable object 448 is received at the second user device 460. If the odds 436 have not changed, the user device 460 can provide the odds 436 for one or more outcomes associated with the event 422 for selection by the user of the user device 460 through one or more wager initiation actionable objects 448. If the odds 436 have changed, the user device 460 can update the odds 436 to reflect the current or most recent odds 436 for one or more outcomes associated with the event 422. The user device 460 can provide the modified odds 436 for selection by the user of the user device through one or more wager initiation actionable objects 448.

Referring now to operation (724), and in some embodiments, a wager initiation can be received. The user device 460 can receive an indication of an interaction with at least one wager initiation actionable object 448 or multiple wager initiation actionable objects 448. The user device 460 can identify the wager information 430 linked with or associated with the wager initiation actionable object 448 and generate instructions 478. The instructions 478 can include a command, code or indication of wager information 430 to be used to generate a wager 476 when received at the server 402. In some embodiments, the user device 460 can generate a wager 476 using the wager information 430 linked with or associated with the selected wager initiation actionable object 448.

Referring now to operation (726), and in some embodiments, instructions 478 can be transmitted. The user device 460 can transmit instructions 478 to the server 402 to place a wager 476 using the wager information 430 or a portion of the wager information 430 represented by the wager initiation actionable object 448. In embodiments, the user device 460 can transmit multiple sets of instructions 478 to the server 402 to place multiple wagers 476 using the wager information 430 with each set of instructions 478 corresponding to at least one selected wager initiation actionable object 448 and at least one wager 476. The instructions 478 can include a type of wager, a wager amount (or multiple wager amounts), a time the wager initiation actionable object 448 was selected, a type of event 422, a team name, a contest name and/or an outcome. In some embodiments, the user device 460 can transmit the wager 476 to be processed at the server 402. The wager 476 can include or identify a type of wager, a wager amount (or multiple wager amounts), a time the wager initiation actionable object 448 was selected, a type of event 422, a team name, a contest name and/or an outcome.

Referring now to operation (728), and in some embodiments, the wager 476 can be processed. The server 402 can receive the instructions 478 from the user device 460 and generate a wager 476 using the wager information 430 or a portion of the wager information 430 indicated by the instructions 478. The server 402 can generate the wager 476 based in part on the time value 434 of the event 422 (e.g., current time of event, current time remaining in the event).

The server 402 can generate the wager 476 based in part on the odds 436 for an outcome of the event 422 represented by the wager information 430 and the selected wager initiation actionable object 448. In embodiments, the server 402 can generate a wager 476 for each set of instructions 478 received form the user device 460 or from multiple user devices 460. The server 402 can generate the wager 476 to include or identify a type of wager, a wager amount (or multiple wager amounts), a time the wager initiation actionable object 448 was selected, a type of event 422, a team name, a contest name and/or an outcome. In some embodiments, the server 402 can receive the wager 476 from the user device 460 and process or enter the wager 476, for example, in a contest or central contest database to officially enter the wager 476. In embodiments, the server 402 can update the user profile 482 for the user to include or indicate the wager 476 and the associated wager information 430. In some embodiments, the server 402 can update a group profile 484 that the user profile 482 for the user is included within to include or indicate the wager 476 and the associated wager information 430. The server 402 can transmit a notification to the user device 460 indicating that the wager 476 has been processed and is active. The method 700 can return to (714) to wait for a subsequent interaction 414 or selection 412.

Referring now to operation (750), and in some embodiments, a new channel 424 can be identified. The node 450 can identify that the channel 424 being accessed at the user device 460 has changed. The node 450 can receive an indication of a user selection 412 corresponding to a change of the channel 424 being accessed or viewed at the user device 460. In some embodiments, the script 408 can detect the change in the channel 424 and transmit an indication of the change to the node 450. The indication can identify the new channel 424 or current channel 424 being accessed by the user device 460. The new or subsequent channel 424 can include or correspond to a new event 422, including but not limited to a sporting event (e.g., football game, baseball game, basketball game).

The node 450 can determine the content 420 being accessed through the channel 424 and the new event 422. In embodiments, the node 450 can use the channel 424 to determine the new content 420 being currently accessed or provided to the user device 460. The node 450 can access a television guide or television schedule indicating what events 422, shows or other forms of content 420 are being provided on what channels 424 to determine the new event 422. In some embodiments, the node 450 can access the television guide or television schedule from a third party server or database indicating what events 422, shows or other forms of content 420 are being provided on what channels 424. The node 450 can determine the event 422 currently being provided to the user device 460 and displayed on the user device 460.

Referring now to operation (752), and in some embodiments, a wager recommendation 442 can be provided. The node 450 can generate and provide one or more new wager recommendations 442 to the user device 460 based on the new channel 424 and new event 422. In embodiments, the node 450 can update the one or more new wager recommendations 442 provided to the user device 460 based on the new channel 424 and new event 422, for example, removing one or more previous wager recommendations 442 and/or providing one or more new wager recommendations 442 corresponding to the new event 422.

The node 450 can determine new or updated wager information 430 based in part on the new event 422 being access or provided to the user through the user device 460 on the new channel 424. The wager information 430 can include one or more wager parameters 432 and/or one or more event parameters 426. In embodiments, the node 450 can use the event parameters 426 to determine or generate wager parameters 432 for the event 422. In some embodiments, the node 450 can access or receive the wager parameters 432 from a third party source or third party server (e.g., contest server, server 402, betting server, etc.). The wager parameters 432 can include but are not limited to, a type of wager, a wager amount, a time associated with a wager 476 (e.g., duration wager is open or available), one or more teams included in a wager 476, a contest name, an outcome, a type of sport, a type of contest, odds 436 associated with the event 422 and/or with the wager 476. The event parameters 426 can include, but are not limited to, a type of sport, time value 434 for the event 422 (e.g., start time, duration, time remaining, end time), teams involved in the event 422, players involved in the event 422, one or more possible outcomes, and/or a contest name.

The node 450 can generate the one or more wager recommendations 442 for the new event 422 responsive to the wager information 430, the one or more wager parameters 432, the time value 434 of the event 422 and/or the channel 424 providing the event 422. The wager recommendation 442 can include a possible outcome or occurrence during the event 422 and odds 436 (e.g., probability) of the outcome or occurrence happening during the event 422. In embodiments, the wager recommendation 442 can include a recommendation to a user for a wager 476 for the event 422 and the wager 476 can include or correspond to a possible outcome (e.g., total score, winning team, total points by one team, over/under bet, moneyline bet) for the event 422 or an occurrence (e.g., next team to score, half-time score) during the event 422. The wager recommendation 442 can include odds 436 indicating a probability of the outcome or occurrence happening during the event 422. The wager recommendation 442 and/or the odds 436 for the wager recommendation 442 can be based in part on a current score of the event 422 and/or a time value 434 (e.g., time remaining) of the event 422.

In embodiments, the node 450 can execute the script 408 to generate the wager recommendation 442. The node 450, using the script 408, can request or access one or more wager recommendations 442 for the event 422 from the server 402 and/or a third party database. The wager recommendations 442 can include dynamic or active wager recommendations 442 that are generated and dynamically updated as the event 422 progresses, a score of the event 422 changes and/or a time value 434 of the event 422 changes. In some embodiments, the node 450, using the script 408, can request or access wager information 430 from the server 402 and/or a third party database and generate the wager recommendations 442 for the event 422 using the received wager information 430. The node 450 can provide the new or updated one or more new wager recommendations 442 to the user device 460 based on the new channel 424 and new event 422. The method 700 can return to (714) to wait for a subsequent interaction 414 or selection 412.

Referring now to operation (760), and in some embodiments, a change in a display of the event 422 can be identified. The node 450 can identify or detect a change in a display of the content 420 and/or event 422 as provided through a display 466 of the user device 460. The change in the display can include a change in a size of the event 422 through the display 466, a change in a number of pixels of the display 466 assigned to display the event 422, a change in a location and/or positon of the event 422 within the display 466 or moving the event 422 from a first portion of the display 466 to a second, different portion of the display 466. In embodiments, the change in display can include, but is not limited to, a different viewing angle, a new television angle (e.g., different camera angle) of the event 422, a change in the content 420 of the event 422 (e.g., split screen showing event 422 and stats for event 422) or any change in a presentation of the event 422 through the display 466 of the user device 460. In embodiments, the node 450 can determine the display parameters 416 of the event 422 within the display 466 to detect the change in the display of the event 422. For example, the node 450 can determine a current positon of the event 422 within the display 466, a current number of pixels allocated to the event 422 within the display 466 and/or a current size of the event 422 (e.g., full screen, partial screen) within the display 466. The node 450 can compare the current display parameters 416 to previous display parameters 416 of the event 422 to determine if the display of the event 422 through the display 466 of the user device 460 has changed or been modified.

Referring now to operation (762), and in some embodiments, display parameters 416 can be modified. The node 450, responsive to detecting the change, can modify the display parameters 416 for the data structure 440 based in part on the changes to the event 422. The display parameters 416 can include, but are not limited to, a position of the data structure 440 within the display 466, a number of pixels allocated to the data structure 440, a size of the display of the data structure 440, a portion of the display 466 assigned to the data structure 440 and/or a prominence of the data structure 440 within the display 466. The node 450 can modify or change the display parameters 416 for the data structure 440 such that the data structure 440 is till display concurrently with the event 422 and positioned based in part on the changes to the display of the event 422.

Referring now to operation (764), and in some embodiments, display parameters 416 can be provided. The node 450 can transmit the modified display parameters 416 to the user device 460 to cause the user device 460 to update or change the display of the data structure 440 relative to the display of the event 422. In some embodiments, the node 450 can provide the modified display parameters 416 to the script 408 and the script 408 can change the display of the data structure 440 relative to the display of the event 422 within the display 466 of the user device 460. The display parameters 416 can be provided to the user device 460 in the form of code, a set of instructions or a command causing the user device 460 and/or script 408 to change the display of the data structure 440 relative to the display of the event 422 within the display 466 of the user device 460.

The user device 460 can use the modified display parameters 416 to change in a positon of the data structure 440 from a first or previous positon within the display 466 to a second, different positon within the display 466. The user device 460 can allocate a different number of pixels to the data structure 440 to change a positon of the data structure 440 and/or a size of the data structure 440 within the display 466. In embodiments, the user device 460 can use the modified display parameters 416 to change a type of border region the data structure 440 is provided as within the display 466. For example, the data structure 440 can be provided as an overlay region within the display 466 such that the event 422 and data structure 440 are displayed and visible to a user of the user device 460 at the same time or concurrently. The user device 460 can use the modified display parameters 416 to change the data structure 440 from a side border region (e.g., side panel) to a bottom border region or top border region of the display 466. In some embodiments, the user device 460 can use the modified display parameters 416 to at least one of a sports ticker, digital on-screen graphic, score box, or score bar. The modified display parameters 416 can be provided to modify the display of the data structure 440 such that the data structure 440 stays visible concurrently with the event 422 within the display 466 as the display of the event 422 changes during the duration of the event 422. The method 700 can return to (714) to wait for a subsequent interaction 414 or selection 412.

Figure 8A:
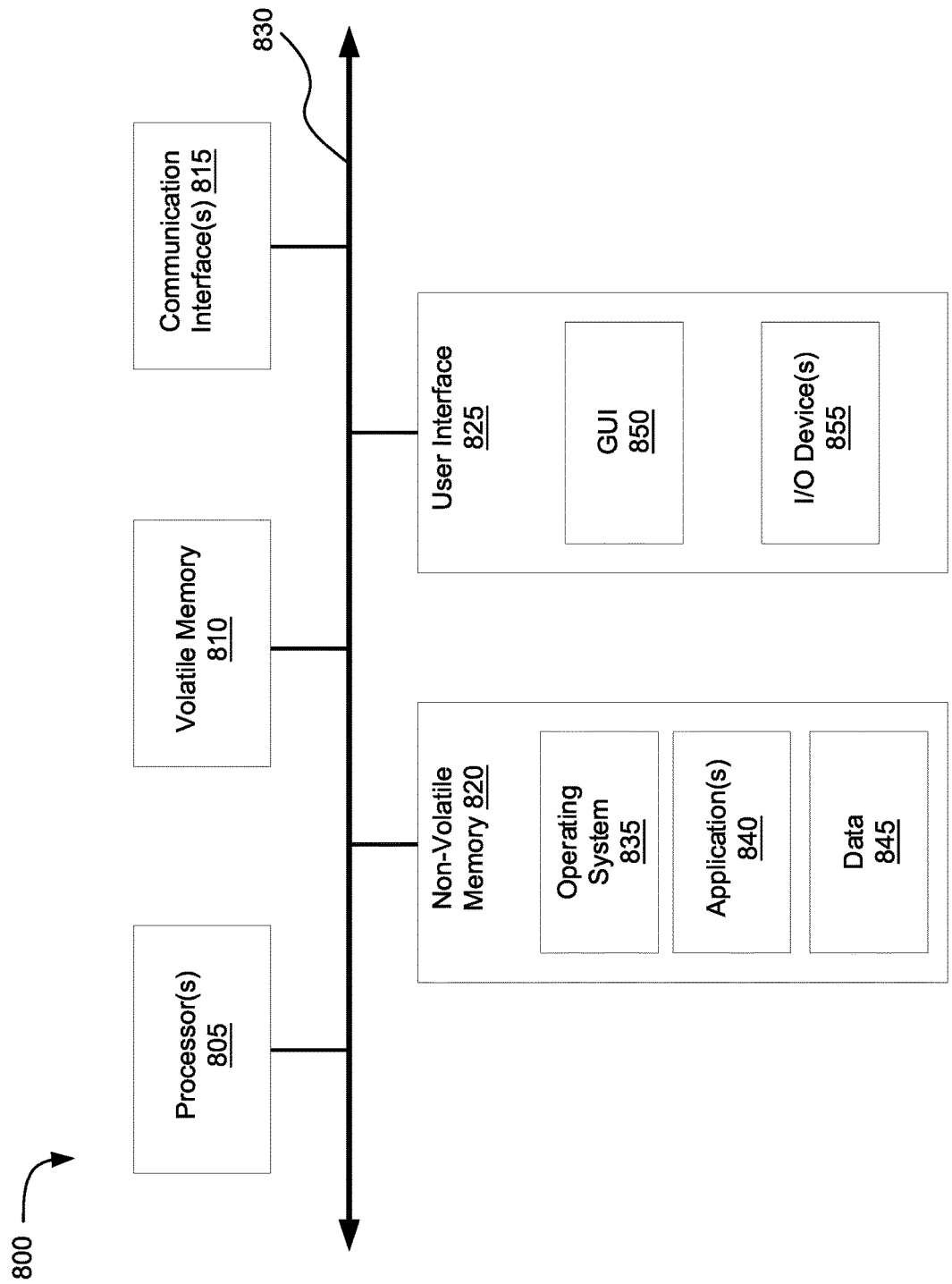
FIG. 8A is a block diagram of embodiments of a computing device.
Figure 8B:
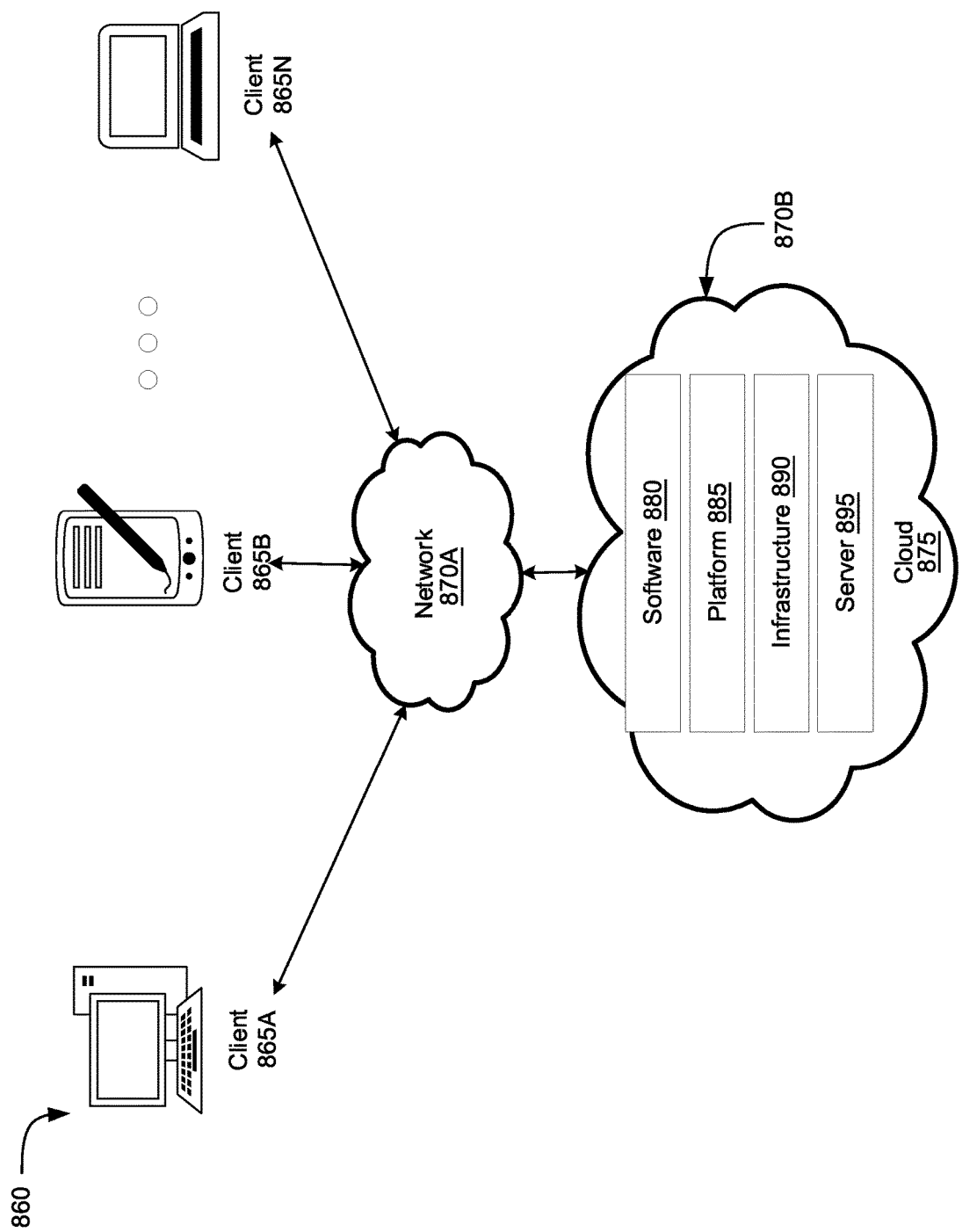
FIG. 8B is a block diagram depicting a computing environment comprising client device in communication with cloud service providers.
Figure 9:
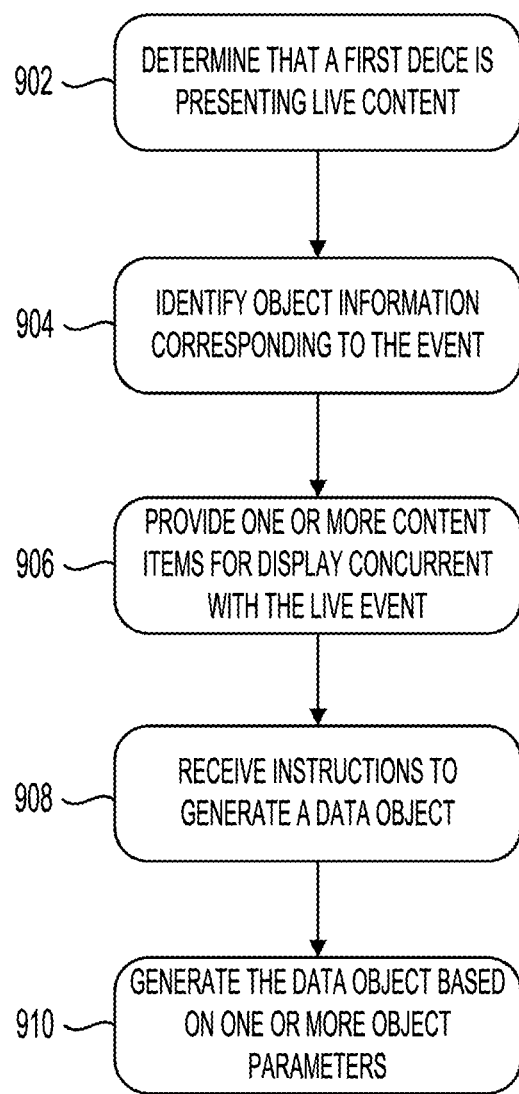
FIG. 9 is an example flow diagram of a method for providing content items based on a live event, in accordance with one or more implementations.

Referring now to FIG. 9, illustrated is an example flow diagram of a method 900 for providing content items based on a live event (e.g., a sporting event, or events as described herein) being displayed at a first device (e.g., which may be a broadcast receiver device such as a cable box or a set top box). The method 900 can be performed, for example, by the node 450, the server 402, or the user device 460, each of which are described herein above in connection with FIGS. 4A-5. The method 900 may also be performed by the computing system 800, described in connection with FIGS. 8A and 8B of Section C.

At step 902, the method 900 can include determining, by a server having one or more processors, that a first device of a user is presenting content (e.g., a channel, as described herein) corresponding to a live event (e.g., an event as described herein) satisfying a condition (e.g., an event being a sporting). At step 904, the method 900 can include identifying, responsive to determining that the first device is presenting the content corresponding to the live event, object information (e.g., wager information, as described herein) corresponding to the event, one or more object parameters (e.g., wager parameters, as described herein) corresponding to the live event, and a time value of the live event.

At step 906, the method 900 can include providing, to the first device, one or more content items (e.g., sometimes referred to herein as "data structures," in connection with FIGS. 4A and 4B) for display concurrent with the live event by the first device. Each content item of the one or more content items can include a link corresponding to a respective object recommendation (e.g., a wager recommendation, as described herein), that when accessed via the first device, causes a server (e.g., the computing system performing the method 900) to transmit a message to a second device of the user using a second device identifier, and present an actionable object configured to cause the second device to transmit instructions to generate a data object corresponding to the content item.

At step 908, the method 900 can include receiving the instructions generate the data object from the second device. The instructions can be transmitted in response to an interaction at the second device. The instructions can identify the data object (e.g., a wager), and any corresponding object parameters or object information, as well as an identifier of the event to which the data object corresponds. At step 910, the method 900 can include generating the data object based on one or more object parameters of the event. The foregoing method steps may be performed, for example, by implementing or performing any of the features described in Section A or Section B.

C. Computing and Network Environment

As shown in FIG. 8A, computer 800 may include one or more processors 805, volatile memory 810 (e.g., random access memory (RAM)), non-volatile memory 820 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 825, one or more communications interfaces 815, and communication bus 830. User interface 825 may include graphical user interface (GUI) 850 (e.g., a touchscreen, a display, etc.) and one or more input/output (I/O) devices 855 (e.g., a mouse, a keyboard, a microphone, one or more speakers, one or more cameras, one or more biometric scanners, one or more environmental sensors, one or more accelerometers, etc.). Non-volatile memory 820 stores operating system 835, one or more applications 840, and data 845 such that, for example, computer instructions of operating system 835 and/or applications 840 are executed by processor(s) 805 out of volatile memory 810. In some embodiments, volatile memory 810 may include one or more types of RAM and/or a cache memory that may offer a faster response time than a main memory. Data may be entered using an input device of GUI 850 or received from I/O device(s) 855. Various elements of computer 800 may communicate via one or more communication buses, shown as communication bus 830.

Computer 800 as shown in FIG. 8A is shown merely as an example, as clients, servers, intermediary and other networking devices and may be implemented by any computing or processing environment and with any type of machine or set of machines that may have suitable hardware and/or software capable of operating as described herein. Processor(s) 805 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 815 may include one or more interfaces to enable computer 800 to access a computer network such as a Local Area Network (LAN), a Wide Area Network (WAN), a Personal Area Network (PAN), or the Internet through a variety of wired and/or wireless or cellular connections.

In described embodiments, the computing device 800 may execute an application on behalf of a user of a client computing device. For example, the computing device 800 may execute a virtual machine, which provides an execution session within which applications execute on behalf of a user or a client computing device, such as a hosted desktop session. The computing device 800 may also execute a terminal services session to provide a hosted desktop environment. The computing device 800 may provide access to a computing environment including one or more of: one or more applications, one or more desktop applications, and one or more desktop sessions in which one or more applications may execute.

Referring to FIG. 8B, a computing environment 860 is depicted. Computing environment 860 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 860 can provide the delivery of shared services (e.g., computer services) and shared resources (e.g., computer resources) to multiple users. For example, the computing environment 860 can include an environment or system for providing or delivering access to a plurality of shared services and resources to a plurality of users through the internet. The shared resources and services can include, but not limited to, networks, network bandwidth, servers 895, processing, memory, storage, applications, virtual machines, databases, software, hardware, analytics, and intelligence.

In embodiments, the computing environment 860 may provide client 865 with one or more resources provided by a network environment. The computing environment 865 may include one or more clients 865a-465n, in communication with a cloud 875 over one or more networks 870A, 870B. Clients 865 may include, e.g., thick clients, thin clients, and zero clients. The cloud 875 may include back end platforms, e.g., servers 895, storage, server farms or data centers. The clients 865 can be the same as or substantially similar to computer 800 of FIG. 8A.

The users or clients 865 can correspond to a single organization or multiple organizations. For example, the computing environment 860 can include a private cloud serving a single organization (e.g., enterprise cloud). The computing environment 860 can include a community cloud or public cloud serving multiple organizations. In embodiments, the computing environment 860 can include a hybrid cloud that is a combination of a public cloud and a private cloud. For example, the cloud 875 may be public, private, or hybrid. Public clouds 875 may include public servers 895 that are maintained by third parties to the clients 865 or the owners of the clients 865. The servers 895 may be located off-site in remote geographical locations as disclosed above or otherwise. Public clouds 875 may be connected to the servers 895 over a public network 870. Private clouds 875 may include private servers 895 that are physically maintained by clients 865 or owners of clients 865. Private clouds 875 may be connected to the servers 895 over a private network 870. Hybrid clouds 875 may include both the private and public networks 870A, 870B and servers 895.

The cloud 875 may include back end platforms, e.g., servers 895, storage, server farms or data centers. For example, the cloud 875 can include or correspond to a server 895 or system remote from one or more clients 865 to provide third party control over a pool of shared services and resources. The computing environment 860 can provide resource pooling to serve multiple users via clients 865 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 860 can provide on-demand self-service to unilaterally provision computing capabilities (e.g., server time, network storage) across a network for multiple clients 865. The computing environment 860 can provide an elasticity to dynamically scale out or scale in responsive to different demands from one or more clients 865. In some embodiments, the computing environment 860 can include or provide monitoring services to monitor, control and/or generate reports corresponding to the provided shared services and resources.

In some embodiments, the computing environment 860 can include and provide different types of cloud computing services. For example, the computing environment 860 can include Infrastructure as a service (IaaS). The computing environment 860 can include Platform as a service (PaaS). The computing environment 860 can include server-less computing. The computing environment 860 can include Software as a service (SaaS). For example, the cloud 875 may also include a cloud based delivery, e.g. Software as a Service (SaaS) 880, Platform as a Service (PaaS) 885, and Infrastructure as a Service (IaaS) 890. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 865 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 865 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 865 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 865 may also access SaaS resources through smartphone or tablet applications, including, e.g., Salesforce Sales Cloud, or Google Drive app. Clients 865 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The invention claimed is:

1. A method comprising:
   providing, by a first device having one or more processors and a touchscreen display that receives user input, an interface having a plurality of content items corresponding to one or more events for which to generate wagers, the first device not configured to present televised broadcasts of the one or more events, the first device configured to set up wagers for placement and not configured to instruct one or more servers to complete placement of the wagers;
   receiving, by the first device from a user via input to the touchscreen display, responsive to selection of one or more content items of the plurality of content items, wager information identifying an event of the one or more events, one or more wager parameters, and a second device identifier identifying a second device of the user that is configured to instruct the one or more servers to complete a wager corresponding to the wager information; and
   transmitting, by the first device to the one or more servers, responsive to receiving the wager information via the interface, a request to generate a wager completion link to complete the wager corresponding to the wager information, the request causing the one or more servers to:
   i) store an entry for the wager including the wager information,
   ii) generate a link to complete the wager based on the wager information, and
   iii) transmit a message to the second device of the user that is capable of completing the wager using the second device identifier, the message including the link, which when accessed via the second device, causes the second device to launch an application executable on the second device that is configured to establish a communication session with the one or more servers and access the wager information via the communication session and present an actionable object configured to cause the second device to transmit instructions to the one or more servers to complete the wager using the wager information.

2. The method of claim 1, further comprising:
   modifying, by the first device responsive to an interaction with the link at the second device, at least one wager parameter; and
   providing, by the first device, the at least one wager parameter to the one or more servers for transmission to the second device.

3. The method of claim 1, further comprising generating, by the first device, the message to include one or more data packets, the one or more data packets including the second device identifier of the second device of the user in a payload portion of the one or more data packets.

4. The method of claim 1, further comprising performing, by the first device with the second device, a handshake responsive to an interaction with the link at the second device.

5. The method of claim 1, further comprising assigning, by the first device, a time value to the one or more events associated with each of the plurality of content items, the time value indicating an expiration date for the event.

6. The method of claim 1, wherein the one or more wager parameters include at least one of a wager type or wager amount.

7. The method of claim 1, further comprising:
   providing, by the first device, a prompt to authenticate the user prior to providing the interface;
   transmitting, by the first device to the one or more servers, information received from the user responsive to the prompt to authenticate the user; and
   receiving, by the first device from the one or more servers, an authentication signal indicating the user is authenticated.

8. A method comprising:
   receiving, by one or more servers, from a first device of a user comprising a touchscreen display that receives user input, wager information for a wager identifying an event of one or more events, one or more wager parameters, and a second device identifier identifying a second device of the user that is capable of completing wagers, the wager information generated via user input to the touchscreen display of the first device, the first device not configured to present televised broadcasts of the one or more events, the first device configured to set up wagers for placement and not configured to instruct the one or more servers to complete placement of the wagers;
   storing, by the one or more servers, the wager information;
   generating, by the one or more servers, a link to complete the wager based on the wager information;
   transmitting, by the one or more servers, using the second device identifier, a message to the second device of the user that is capable of completing the wager, the message including the link;
   receiving, by the one or more servers, from the second device responsive to establishing a communication session between the second device and the one or more servers, a request to access the wager information responsive to an interaction with the link on the second device;
   providing, by the one or more servers, to the second device using the second device identifier, the wager information, causing the wager information to be presented on the second device with an actionable object configured to cause the second device to transmit instructions to the one or more servers to complete the wager using the wager information;

receiving, by the one or more servers, responsive to an interaction with the actionable object, via the communication session, a request to complete the wager using the wager information; and , completing, by the one or more servers, the wager responsive to the request.

9. The method of claim 8, wherein the one or more servers receive the wager information from the first device, and wherein the user is not signed into a user account at the first device; and wherein prior to receiving the request to complete the wager, the user is signed into the user account on the second device.

10. The method of claim 8, further comprising modifying, by the one or more servers, at least one wager parameter associated with the event based on an interaction performed at the second device.

11. The method of claim 8, further comprising identifying, by the one or more servers, a respective time value associated with the one or more events, the time value indicating an expiration date for the event.

12. The method of claim 8, wherein the one or more wager parameters include at least one of a wager type or a wager amount.

13. A system comprising:
a first device comprising (i) a touchscreen display that receives user input and (ii) one or more processors coupled to a non-transitory memory, the one or more processors configured to:
provide an interface having a plurality of content items corresponding to one or more events for which to generate wagers, the first device not configured to present televised broadcasts of the one or more events, the first device configured to set up wagers for placement and not configured to instruct one or more servers to complete placement of the wagers;
receive, from a user via input to the touchscreen display, responsive to selection of one or more content items of the plurality of content items, wager information identifying an event of the one or more events, one or more wager parameters, and a second device identifier identifying a second device of the user that is configured to instruct the one or more servers to complete a wager corresponding to the wager information; and
transmit, to the one or more servers, responsive to receiving the wager information via the interface, a request to generate a wager completion link to complete the wager corresponding to the wager information, the request causing the one or more servers to:
i) store an entry for the wager including the wager information,
ii) generate a link to complete the wager based on the wager information, and
iii) transmit a message to the second device of the user that is capable of completing the wager using the second device identifier, the message including the link, which when accessed via the second device, causes the second device to launch an application executable on the second device that is configured to establish a communication session with the one or more servers and access the wager information via the communication session and present an actionable object configured to cause the second device to transmit instructions to the one or more servers to complete the wager using the wager information.

14. The system of claim 13, wherein the one or more processors are further configured to:
modify, responsive to an interaction with the link at the second device, at least one wager parameter; and
provide the at least one wager parameter to the one or more servers for transmission to the second device.

15. The system of claim 13, wherein the one or more processors are further configured to generate the message to include one or more data packets, the one or more data packets including the second device identifier of the second device of the user in a payload portion of the one or more data packets.

16. The system of claim 13, wherein the one or more processors are further configured to perform, with the second device, a handshake responsive to an interaction with the link at the second device.

17. The system of claim 13, wherein the one or more processors are further configured to assign a time value to the one or more events associated with each of the plurality of content items, the time value indicating an expiration date for the event.

18. The system of claim 13, wherein the one or more wager parameters include at least one of a wager type or a wager amount.

19. The system of claim 13, wherein the one or more processors are further configured to:
provide a prompt to authenticate the user prior to providing the interface;
transmit, to the one or more servers, information received from the user responsive to the prompt to authenticate the user; and
receive, from the one or more servers, an authentication signal indicating the user is authenticated.

20. A system comprising:
one or more processors coupled to a non-transitory memory, the one or more processors configured to:
receive, from a first device of a user comprising a touchscreen display that receives user input, wager information for a wager identifying an event of one or more events, one or more wager parameters, and a second device identifier identifying a second device of the user that is capable of completing wagers, the wager information generated via user input to the touchscreen display of the first device, the first device not configured to present televised broadcasts of the one or more events, the first device configured to set up wagers for placement and not configured to instruct the one or more servers to complete placement of the wagers;
store the wager information;
generate a link to complete the wager based on the wager information;
transmit, using the second device identifier, a message to the second device of the user that is capable of completing the wager, the message including the link;
receive, from the second device responsive to establishing a communication session between the second device and the one or more processors, a request to access the wager information responsive to an interaction with the link on the second device;
provide, to the second device using the second device identifier, the wager information, causing the wager information to be presented on the second device with an actionable object configured to cause the second device to transmit instructions to the one or more servers to complete the wager using the wager information;

receive, responsive to an interaction with the actionable object, via the communication session, a request to complete the wager using the wager information; and complete the wager responsive to the request.

21. The system of claim 20, wherein the one or more processors receive the wager information from the first device, and wherein the user is not signed into a user account at the first device; and wherein prior to receiving the request to complete the wager, the user is signed into the user account on the second device.

22. The system of claim 20, wherein the one or more processors are further configured to modify at least one wager parameter based on an interaction performed at the second device.

23. The system of claim 20, wherein the one or more processors are further configured to identify a respective time value associated with the one or more events, the time value indicating an expiration date for the event.

24. The system of claim 20, wherein the one or more wager parameters include at least one of a wager type or a wager amount.

* * * * *